(12) United States Patent
Tampieri

(10) Patent No.: US 6,313,842 B1
(45) Date of Patent: Nov. 6, 2001

(54) GENERATING IMAGE DATA

(75) Inventor: Filippo Tampieri, Montreal (CA)

(73) Assignee: Discreet Logic Inc. (CA)

( * ) Notice: Subject to any disclaimer, the term of this patent is extended or adjusted under 35 U.S.C. 154(b) by 0 days.

(21) Appl. No.: 09/261,121

(22) Filed: Mar. 3, 1999

(51) Int. Cl.[7] ................................................ G06T 15/60
(52) U.S. Cl. ............................................................ 345/426
(58) Field of Search .............................................. 345/426

(56) References Cited

U.S. PATENT DOCUMENTS

| | | | |
|---|---|---|---|
| 4,928,250 | * 5/1990 | Greenberg et al. | 364/518 |
| 5,175,808 | 12/1992 | Sayre . | |
| 5,313,568 | * 5/1994 | Wallace et al. | 395/126 |
| 5,488,700 | 1/1996 | Glassner . | |
| 5,579,455 | 11/1996 | Greene et al. . | |
| 5,734,385 | * 3/1998 | Mima | 345/426 |
| 5,808,620 | 9/1998 | Doi et al. . | |
| 5,894,309 | * 4/1999 | Freeman et al. | 345/426 |
| 5,909,087 | * 6/1999 | Bryde et al. | 315/149 |
| 5,914,721 | 6/1999 | Lim . | |
| 5,936,633 | 8/1999 | Aono et al. . | |
| 6,078,332 | * 7/2000 | Ohazama | 345/426 |
| 6,084,590 | * 7/2000 | Robotham et al. | 345/419 |

OTHER PUBLICATIONS

"Interactive Design of Complex Tim–Dependent Lighting" by Julie Dorsey et al., in IEEE Computer Graphics and Applications vol. 15, No. 2, Mar. 1995, pp. 26–35.*

"Implementation and Analysis of an Image–Based Glaobal Illumination Framework for Animated Environments" by Jeffrey Nimeroff, in IEEE Transactions on Visualization and Computer Graphics, vol. 2, No. 4, Dec. 1996, pp. 283–297.*

D. Lischinski et al., "Discontinuity Meshing for Accurate Radiosity," Cornell Univ., IEEE Comp. Graphics and Applications, pp. 25–39, 1992.

D.W. George et al., "Radiosity Redistribution for Dynamic Environments," Cornell Univ., IEEE Comp. Graphics and Applications, pp. 26–34, 1990.

Y. Chrysanthou, "Fast Approximate Quantitative Visibility for Complex Scenes," IEEE Comp. Graphics Int'l Proceedings, pp. 220–227, 1998.

E. Pang et al., "An Efficient Implementation of Affine Transformation Using One–Dimensional FFT's," University of Toronto, Ontario, Canada MTS 3G4, IEEE Conf., 4:2885–2888, 1997.

* cited by examiner

Primary Examiner—Mark Zimmerman
Assistant Examiner—Enrique L. Santiago
(74) Attorney, Agent, or Firm—Gates & Cooper LLP

(57) ABSTRACT

Image data is generated from scene data, possibly within a virtual set. The scene data defines surfaces and a plurality of lighting banks. A multi-resolution representation of a radiosity equation is constructed with respect to the scene data. The radiosity equation is solved individually for each of the light banks. A light bank for which a solution is being sought is switched on with the remaining light banks being switched off.

35 Claims, 21 Drawing Sheets

Figure 5B $\quad B_i A_i = E_i A_i + R_i \sum_{j=1}^{n} B_j A_j \cdot F_{ji}$

Figure 5C $\quad F_{ij} \cdot A_i = F_{ji} \cdot A_j$

Figure 5D $\quad B_i = E_i + R_i \sum_{j=1}^{n} B_j F_{ij}$ $$B_{ir} = E_{ir} + R_{ir} \sum_{j=1}^{n} B_{jr} F_{ij} \qquad 1601$$

$$B_{ig} = E_{ig} + R_{ig} \sum_{j=1}^{n} B_{jg} F_{ij} \qquad 1602$$

$$B_{ib} = E_{ib} + R_{ib} \sum_{j=1}^{n} B_{jb} F_{ij} \qquad 1603$$

*Figure 16*

$$B_i = \sum_{k=1}^{n} C_k B_{ik}$$

Where $B_i$ = brightness of element i $C_k$ = Control amplitude $0 \leqslant C_k \leqslant 1$
for lighting bank k $B_{ik}$ = pre-calculated brightness of element i, when light bank k is at maximum intensity Equation is repeated 3 times for R,G,B.

*Figure 18*

GENERATING IMAGE DATA

FIELD OF THE INVENTION

The present invention relates to generating image data by radiosity, wherein a plurality of output data values express respective lighting conditions.

BACKGROUND OF THE INVENTION

Several procedures are known for rendering images containing elements defined as three dimensional data. A known approach to generating images of photo-realistic quality is to consider reflections between all elements simultaneously. The light emission of any given element is considered as being dependent upon the sum of contributions from all other elements, and a set of equations is defined that represents these interactions. The light emission values for all the elements, are then determined simultaneously by solving a system of equations.

This procedure is known as radiosity simulation. The system of equations is usually extremely large, and several refinements to radiosity simulation have been established in order to make implementation of this method practical for scenes containing large numbers of elements.

A known advantage of radiosity is that once the system of equations has been solved, and light emission values determined, the light emission of elements may be considered as view-independent, resulting in a separate radiosity rendering process which is capable of rendering a view from any position. The high efficiency of radiosity rendering makes radiosity particularly suitable for demanding applications, such as generating long sequences of image data frames for film or video, or generating image data in real-time.

Lighting sources may be superimposed upon a radiosity rendered scene, and graphics systems are known which support direct light source simulations, such as those using Phong shading, so that lighting effects may be adjusted in real-time. High quality lighting algorithms, such as ray tracing, are difficult to calculate in real-time, and so are unsuitable for providing changing lighting conditions at a speed that matches that of radiosity rendering.

Complex real time lighting effects may be achieved within radiosity by splitting fixed lighting combinations into light banks, whose intensities may then be varied when rendering. Thus, although the light sources are fixed in position, light banks may be located at different positions, and their variation in intensity, as well as generating changes in colour shading, can result in dramatic changes to the shadows in the image. The addition of light flux components incident upon a surface is linear. Thus it is possible to pre-compute a radiosity simulation for a scene which is illuminated by a plurality of light banks. When three light banks are used, whose intensity is to be varied, three radiosity solutions may be calculated, one for each light bank. The results of the solutions may then be linearly combined in response to fader settings from a lighting mixer at the time of rendering.

This approach is described in "Interactive Design Of Complex Time-Dependent Lighting" by Julie Dorsey, James Arvo and Donald Greenberg, in IEEE Computer Graphics And Applications volume 15, number 2, March 1995. Although this approach provides a high degree of efficiency at the time of rendering, the radiosity simulation needs to be performed for each of the light banks that are being used. Radiosity simulation is a time consuming process, and this is multiplied by the number of light banks whose contributions are to be varied.

SUMMARY OF THE INVENTION

According to a first aspect of the present invention, there is provided a method of generating image data from scene data, wherein said scene data includes surfaces and a plurality of light banks, comprising the steps of: constructing a multi-resolution representation of a radiosity equation with respect to said scene data; and solving said radiosity equation individually for each of said light banks, wherein a light bank for which a solution is being sought is switched on with the remaining light banks being switched off.

In a preferred embodiment, the scene emission data is stored separately for each solution of the radiosity equation and, preferably, radiosity equations are combined in response to a change in a required light bank intensity. Preferably, solutions of the radiosity equation are combined in response to a change in a required light bank color and the light bank changes may be requested in real-time. The light bank requirements may be determined in response to manually operated lighting control faders or the light banks requirements may be determined in response to recorded data.

In a preferred embodiment, the light bank requirements are determined in response to data from a virtual set.

According to a second aspect of the present invention, there is provided apparatus for generating image data from scene data, including processing means, and storage means for storing said scene data and instructions for said processing means, wherein said scene data includes surfaces and a plurality of light banks; and said instructions are configurable to control said processing means to perform the steps of: constructing a multi-resolution representation of a radiosity equation for said scene; and solving said radiosity equation individually for each of said light banks, wherein a light bank for which a solution is being sought is switched on with the remaining light banks being switched off.

BRIEF DESCRIPTION OF THE DRAWINGS

FIG. 5B summarises light energy transfer between a single receiving surface, and an arbitrary number of emitting surfaces;

FIG. 5C shows the radiosity reciprocity equation;

FIG. 5D shows the classical radiosity equation;

FIG. 16 details equations for the solution of the radiosity equation with respect to red, green and blue colour components;

FIG. 18 details the step of linear combination of scene data as shown in FIG. 17;

DETAILED DESCRIPTION OF THE PREFERRED EMBODIMENTS

Figure 1:
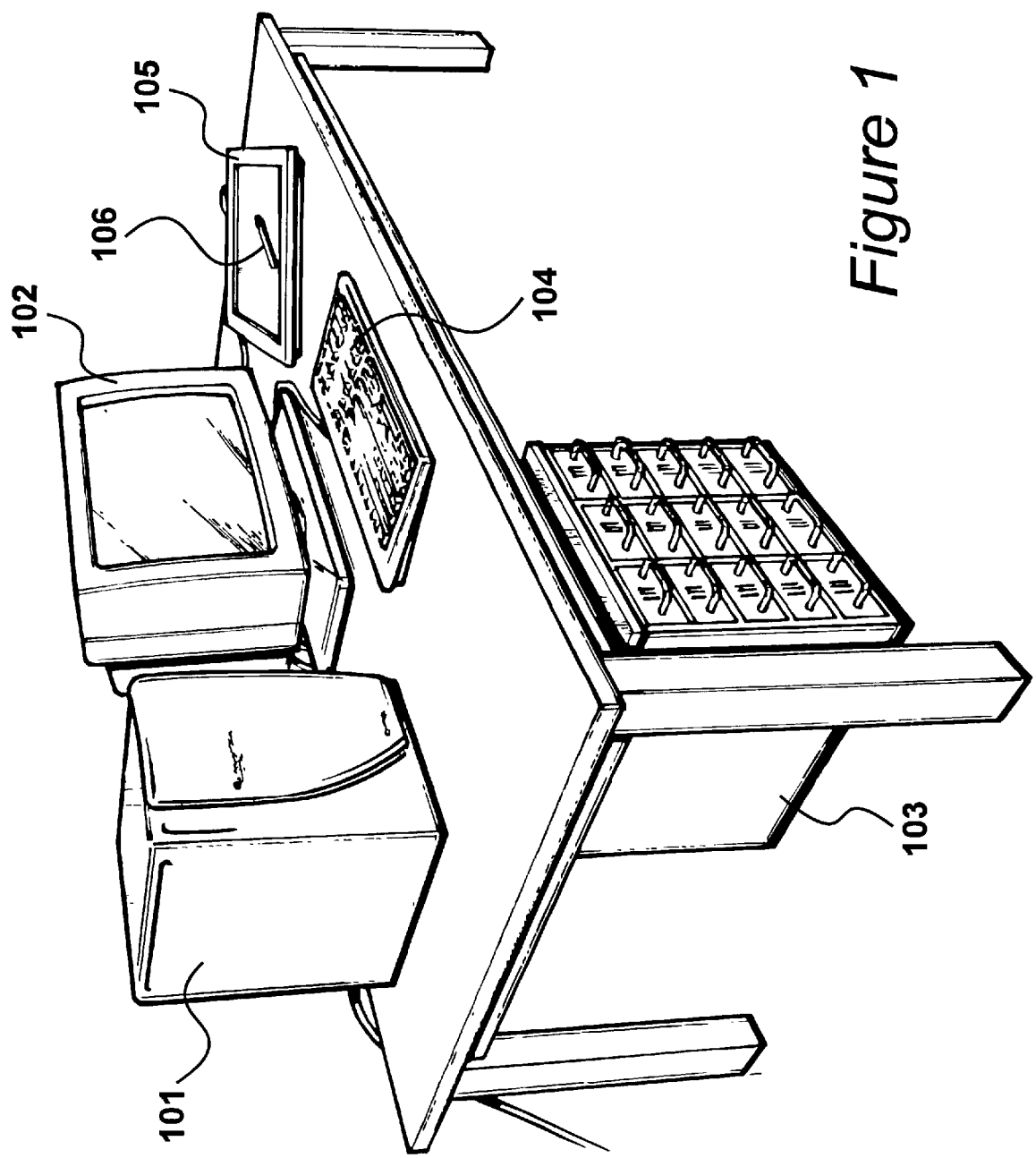
FIG. 1 shows a system for generating image data, including a monitor and a processing system.

A system for generating image data using radiosity is illustrated in FIG. 1. The radiosity process involves performing a radiosity simulation in which light emission values are calculated for all elements in the scene, irrespective of viewing position. Thereafter, this information is made available for particular viewing positions during radiosity rendering. The rendering process requires a sufficiently low level of computation to enable image frames of high definition and high photo realism to be rendered with high efficiency.

A processing system 101, such as an Octane™ produced by Silicon Graphics Inc., supplies output image signals to a video display unit 102. A user defines a scene in terms of objects in three dimensions, or by importing three-dimensional scene data from a pre-existing scene structure. The user may also determine a stationary or moving camera position from which to view the resulting rendered scene image. Rendered frames of image data, derived from three-dimensional scene data, are stored by means of a striped redundant array of inexpensive discs (RAID) 103. The system receives user commands from a keyboard 104 and a graphics tablet 105 operated by a pressure sensitive stylus 106.

Figure 2:
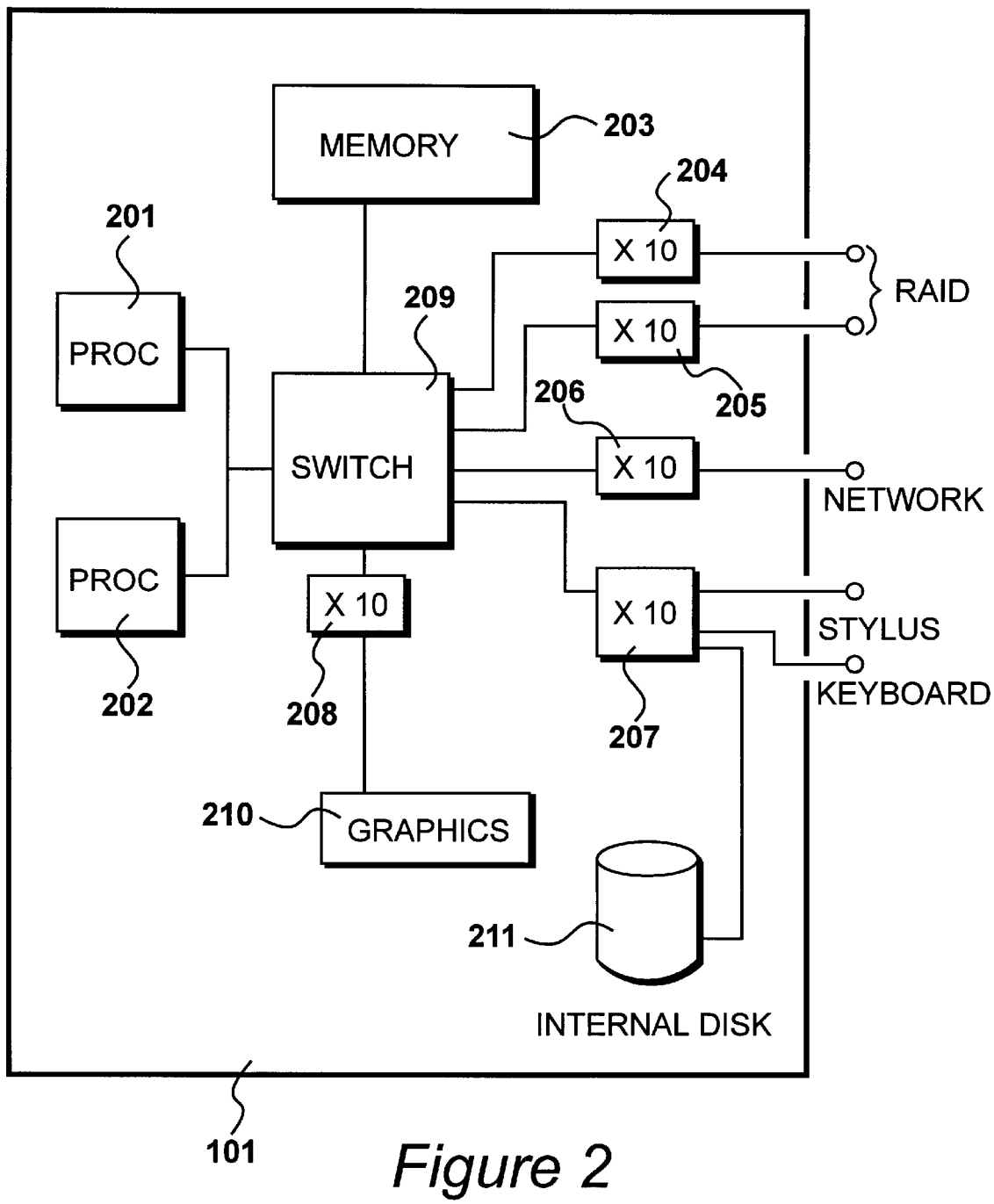
FIG. 2 details the processing system shown in FIG. 1.

The processing system 101 is detailed in FIG. 2. The processing system comprises two central processing units 201 and 202 operating in parallel. Each of these processors is a MIPS R10000 manufactured by MIPS Technologies Incorporated, of Mountain View, Calif. A non-blocking cross-bar switch 209 permits non-blocking full bandwidth communication between the two processors 201 and 202 with a memory 203 and other peripherals. The memory 203 includes typically two hundred and fifty-six megabytes of dynamic RAM. The memory is used to store instructions for the processors, and data, including a large quantity of element data that is required while performing the process of radiosity simulation. Input and output interface circuits are denoted as XIO in the diagram shown in FIG. 2. External connections, and connections to slow peripherals such as serial ports are made via XIO interface circuits, in order to provide synchronisation between the peripheral circuits and the extremely high speed data paths of the main processor structure.

A first XIO interface circuit 204 provides bidirectional connections to the RAID array 103 shown in FIG. 1. A second XIO interface circuit 205 provides additional connectivity to an additional RAID array, should it become necessary to increase storage requirements for image data. A third XIO interface circuit 206 provides a data connection to a network, over which three-dimensional scene data may be shared. A further XIO interface circuit 207 facilitates connection with the stylus 105 and the keyboard 104 shown in FIG. 1, in addition to an internal hard disk drive 211, four gigabytes in size, upon which instructions for the processors 201 and 202 are stored. An additional XIO interface circuit provides a connection between the cross-bar switch 209 and a graphics processor 210. The graphics processor 210 receives instructions from processors 201 and 202 in such a way as to construct a two dimensional image field for display on the video monitor 102.

Figure 3:
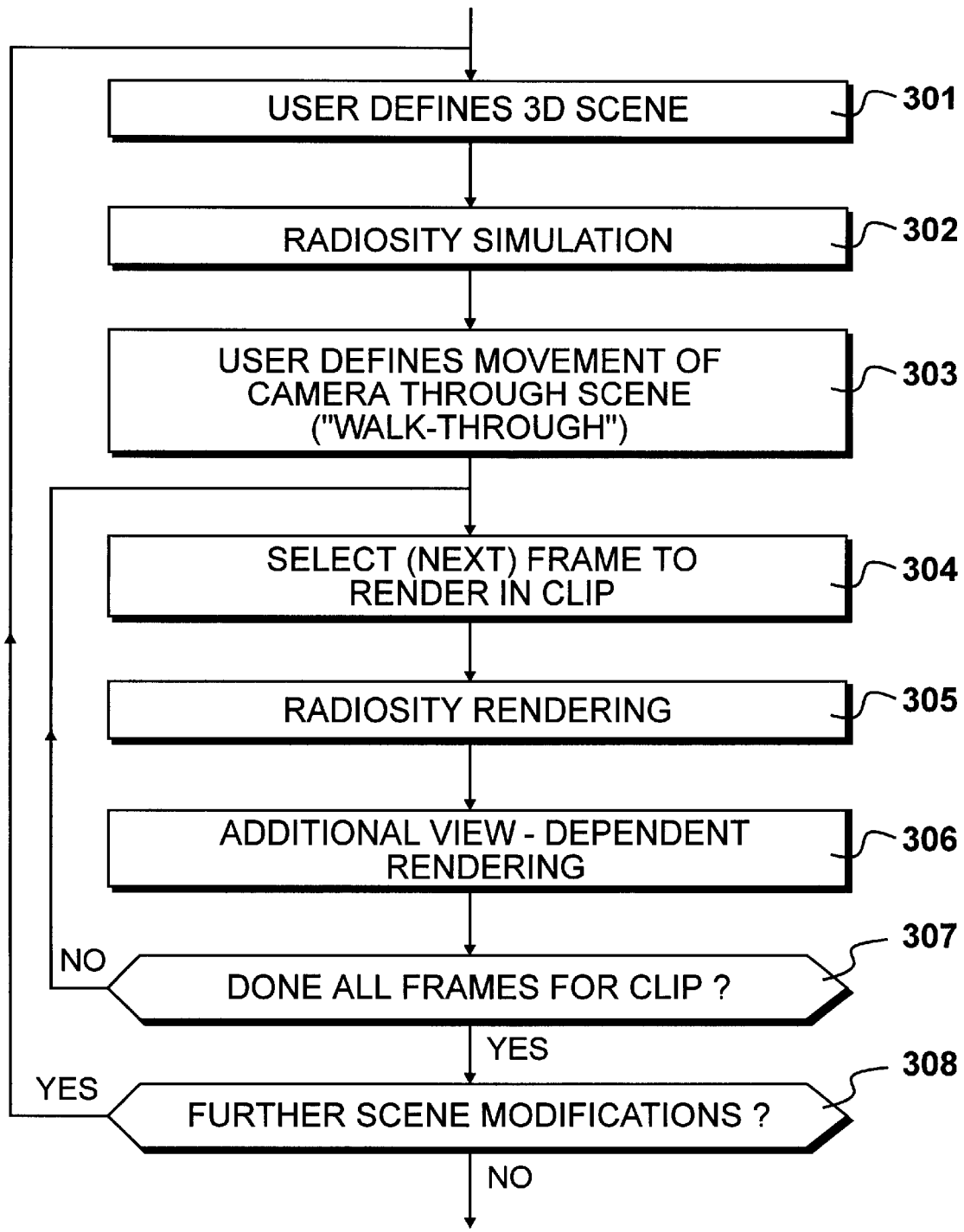
FIG. 3 details processes performed by the processing system shown in FIG. 1 when generating image data, including a process of radiosity simulation.

Procedures performed by processors 201 and 202 are illustrated in FIG. 3. At step 301 a user defines a three dimensional scene, which may involve importing three dimensional information from an external source, for example over the network connection. At step 302 a radiosity simulation is performed, configured to analyse objects within the scene so as to optimise their deconstruction into mesh elements, and then to calculate a light emission value for each mesh element.

At step 303 the user defines movement of a virtual camera through the scene, defining a changing view that is known as a "walk through". The same element light emission values generated by the radiosity simulation procedure 302 may be used for any desired camera view, provided that the relative positioning of objects within the scene does not change.

At step 304 a frame is selected for rendering and at step 305 radiosity rendering is performed. In radiosity rendering, the light emission of each element is projected with respect to the camera position into a two dimensional image plane. At step 306 additional view-dependent rendering is added. Radiosity generates light emission values for elements, irrespective of view. This is known as view-independent rendering. However, certain aspects of a scene may require view-dependent lighting, for example, when a mirror or other highly reflective object is present. In order to achieve photo-realism, it is then necessary to combine the radiosity rendering procedure with light emission values determined by a view-dependent procedure, such as ray tracing. Given that only a small part of the resulting image is view dependent, the additional complexity of the ray tracing procedure need not result in an excessive computational increase. Alternatively, other, less realistic view-dependent procedures may be used for speed. When combined with the high degree of realism provided by radiosity, these can still result in a highly realistic overall image being created.

At step 307 a question is asked as to whether all of the frames for the clip have been rendered. When answered in the negative, control is returned to step 304, whereupon the next frame of the clip is selected and the radiosity rendering procedure 305 is repeated. Eventually, the question asked at step 307 will be answered in the affirmative and control will be directed to step 308. At step 308 a question is asked as to whether aspects of the existing scene need to be modified in order to improve the quality of the result. When answered in the affirmative control is returned to step 301. Eventually, no further modifications will be necessary and the question asked at step 308 will be answered in the negative.

Figure 4:
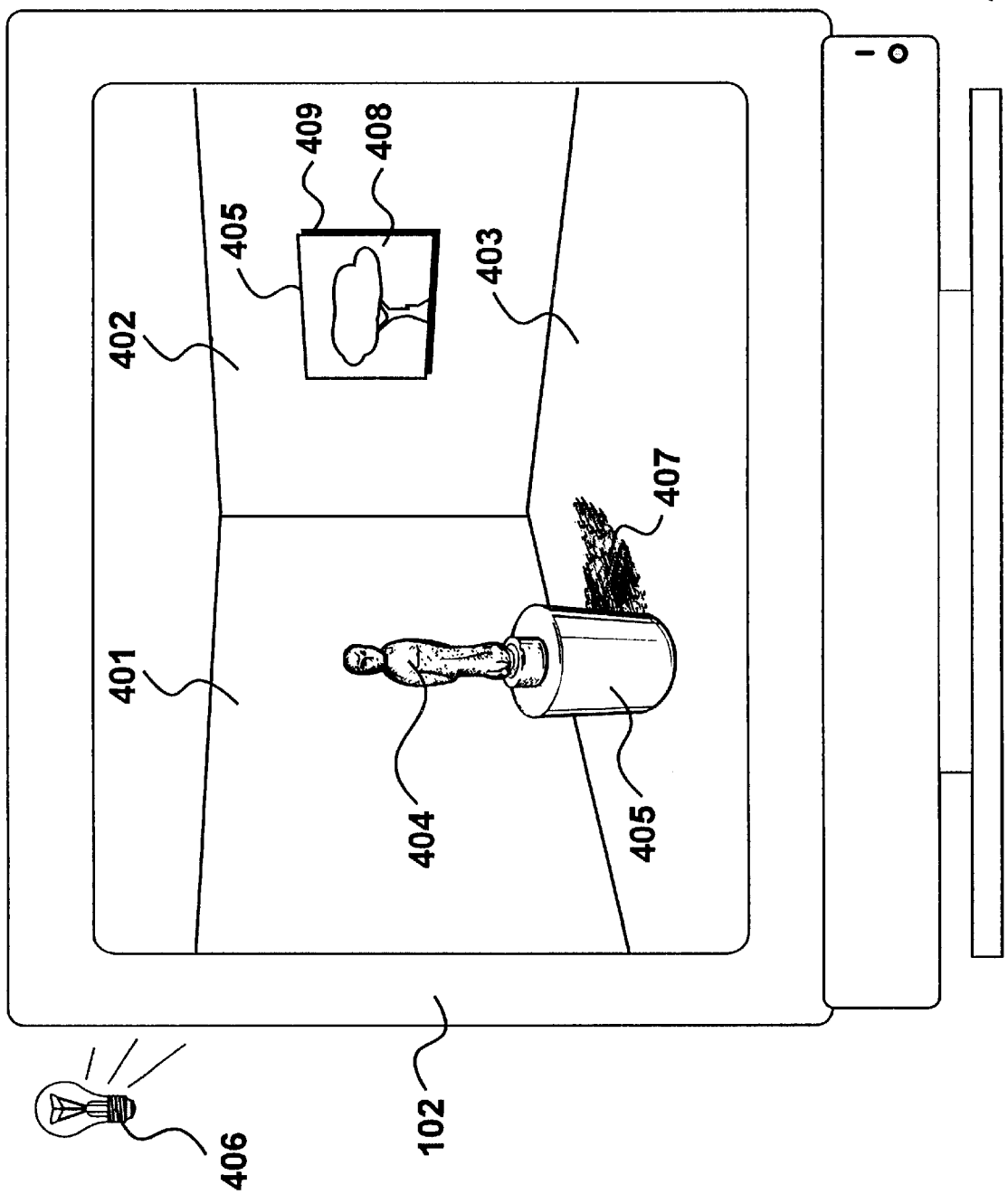
FIG. 4 details an image displayed on the monitor shown in FIG. 1, including several scene objects, that include two walls and a picture.

An example of a scene for rendering using a radiosity procedure is illustrated in FIG. 4. The scene consists of a room including a first wall 401, a second wall 402, and a floor 403. A statue 404 is located on the floor 403 and a picture 405 is shown hung on the wall 402. Radiosity simulation 302 is performed with reference to a light source, illustrated as light source 406, but which, because of the view point defined by the position of the virtual camera, does not itself appear as part of the resulting two dimensional image. The relative positioning of the light 406 and the statue 404 results in a shadow 407 being cast on floor 403. Similarly, given the position of light source 406, a frame 408 of picture 405 also casts a slight shadow 409) against the wall 402.

The presence of a light source in the scene results in a quantity of light energy being introduced. This light energy is scattered throughout the scene in a complex way, that is dependent upon the reflectivities, shapes and positioning of objects within the scene. Radiosity simulation constructs a system of equations to represent these relationships, and is thereby able to determine light emission values that are very realistic.

Figure 5A:
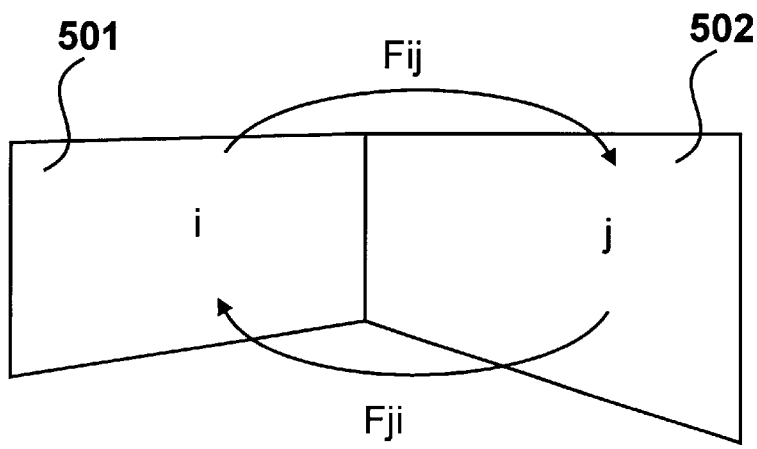
FIG. 5A summarises light energy transfer between a pair of objects, such as the two walls shown in FIG. 4.

The basic approach to performing the radiosity simulation 302 is outlined in FIGS. 5A, 5B, 5C and 5D. FIG. 5A details two elements 501 and 502 in a scene. The two elements are at right angles, such that it can be seen that not all of the light energy from element 5011 will be transferred to element 502, and vice versa. The actual proportion of light energy transferred from one element to another is called the form factor. If element 501 is considered to be a source element i, and element 502 is considered to be a receiving element j, the form factor for the transfer of light energy per unit area from i to j is denoted Fij. Similarly, the proportion of energy from element j transferred to element i is denoted Fji.

It can be seen from this example that calculating the form factor requires a determination of the visibility of the source element with respect to the receiving element. This is made more complex if a third occluding element is possibly present, which may totally or partially block light transfer between the elements for which the form factor is being calculated. In the event that a scene comprises only two elements 501 and 502, and one of these is a light source, it is possible to construct a pair of simultaneous equations which may be solved in order to obtain the light emission from each element. In practice, however, a scene comprises many objects, each of which may need to be subdivided into a mesh of elements in order to obtain a sufficiently accurate representation of light variation across surfaces.

Given the form factors for all element interactions that are being considered, the total brightness from an element i is obtained by considering the sum of light energies directed at it from all of the other elements in the scene. This relationship is illustrated in FIG. 5B. The fundamentals underpinning the radiosity approach are derived from notions of conservation of energy and the total light energy flux emitted by a particular element is therefore considered as the product between a flux density value B and the area of the element A, identified as the product BA. Thus, for a particular element i, the energy flux radiated by this element is identified as the product BiAi which is then considered as equal to the self emission of the element Ei multiplied again by its area Ai plus the sum of all light received from all of the co-operating elements. Thus, for every single co-operating element in the scene, each instance of which is denoted by the letter j, the amount of light received by element i is equal to the flux density Bj of element j multiplied by the area Aj of element j multiplied by the form factor Fji expressing the proportion of light transferred from j to i. The sum of these values is then multiplied by the reflectance Ri representing the reflectance of element i.

As previously stated, the procedure is underpinned by notions of conservation of energy. Therefore, in accordance with this principle, the form factor Fij for the transfer of light energy from i to j, multiplied by the area Ai of element i is equal to the form factor Fji representing the transfer of light energy from j to i multiplied by the area Aj of j, as shown in FIG. 5C. This is known as the radiosity reciprocity equation. This relationship may be substituted into the equation of FIG. 5B to give the equation shown in FIG. 5D, which is known as the classical radiosity equation. In FIG. 5D, the flux density Bi of element i is given by the source flux density Ei of element i plus the reflectance Ri multiplied by the sum for each element j, of flux density Bj multiplied by the form factor Fij.

The equation shown in FIG. 5D is the one used to determine light emission values for elements in a scene. In a scene containing fifty thousand elements, the right side of this equation would have to be evaluated fifty thousand times in order to obtain an initial illumination value for a single element i. Thus, in order to calculate an initial illumination value for all fifty thousand elements, the right side of this equation must be evaluated fifty thousand times, fifty thousand times. Furthermore, this large number is also the number of form factors that need to be calculated before the system of equations can be solved. Thus, a radiosity simulation utilising this approach is impractical for realistic image synthesis of scenes containing large numbers of elements.

Figure 6:
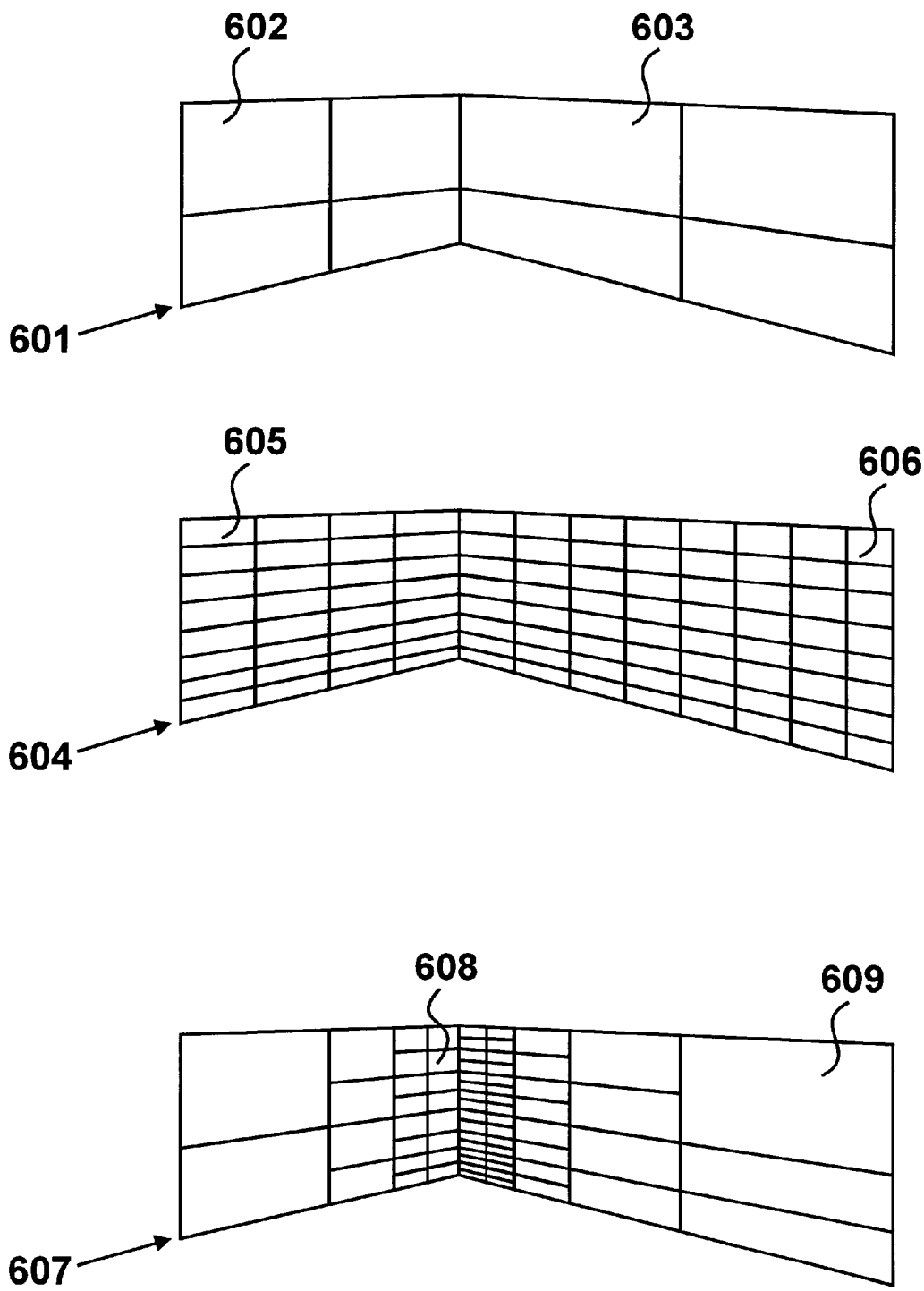
FIG. 6 indicates meshing strategies for the walls shown in FIG. 4.

A solution in which a relatively low number of elements are present is illustrated at 601 in FIG. 6. The image consists of two walls, in which the first wall has been subdivided into four mesh elements 602 and a second wall has also been subdivided into four mesh elements 603. The total number of elements present is relatively small, thereby reducing computational time when evaluating the equation in FIG. 5D, but this in turn results in a coarse image having visible artefacts. This problem may be understood by considering that, although illumination throughout the scene is non-linear, the illumination gradient where the walls meet changes faster than in the middle of a wall. Thus, by rendering the scene at the level of resolution shown at 601.

A solution to this problem is shown at 604. In this example, the walls are the same as those identified at 601 but each wall has been divided into substantially more mesh elements. Thus, a first wall is made up of sixty-four elements 605 with a similar sixty-four element mesh 606 being present in the second wall. This results in a significant improvement of the overall realism of the image but a major increase in terms of computational overhead. It can be seen that the complexity of solving the equation in FIG. 5D increases in proportion to the square of the number of elements present, when this approach is used. Furthermore, it may be understood that while the level of meshing has been increased where this is important, close to the intersection of the walls, it has also been increased unnecessarily in other areas.

Computational time may be reduced while maintaining image quality by taking a hierarchical approach as illustrated at 607. In this example, the walls have been divided into a large number of small elements, such as element 608, at positions where the interaction between the walls is greatest. Similarly, at a distance displaced from the intersection, the elements, such as element 609, are significantly larger. In this way, good image quality is obtained while computational overhead is reduced. This type of meshing is further enhanced by only evaluating form factors between mesh elements at an appropriate level of resolution. For example, a large mesh element at the edge of a wall need not evaluate multiple form factors for interactions between all the small mesh elements on the wall opposite that are close to the intersection. Instead, an appropriate coarse superset of the smallest mesh elements is selected for this interaction. Thus it becomes possible to consider the mesh as a nested hierarchy, such that, whenever possible, coarser mesh elements are used to define light exchanges. The subdivisions of coarse mesh elements are used when the predicted accuracy of light interchange is not sufficiently high. This technique is known as hierarchical radiosity. A data structure representing the nested levels of mesh elements is known as a multi-resolution representation of the radiosity equation.

Hierarchical radiosity may still be time consuming, as there may be many thousands of objects within a scene. Thus, regardless of the efficiency of the hierarchical mesh, there are still a minimum number of interactions that are defined to be the square of the number of objects. In typical photo-realistic scenes, this number may still be prohibitively high. In order to reduce the computation still further, additional procedures have been established in order to extend hierarchical radiosity. In radiosity with clustering, certain combinations of objects, such as the statue 404 shown in FIG. 4, and its base 405, are considered as forming a single cluster element. Interactions with distant elements, such as those comprising a wall 402, may then be expressed by the use of a single form factor, because the light reaching the wall from the statue is weak. The difference between the statue as it is, and the statue represented, for example, as a single radiating cylinder, will be below the required accuracy threshold when calculating the form factor for transfer from the statue to the wall. Closer surfaces, such as wall 401, may need to consider the statue as comprising a number of elements, each having different light emission values, in order to determine local light emission gradients with sufficient accuracy. The combination of hierarchical radiosity with clustering reduces the number of element relationships from n squared to approximately n log n, where n is the number of mesh elements in the scene. It is this reduction in complexity that has enabled the radiosity technique to be considered for use in many applications.

Figure 7:
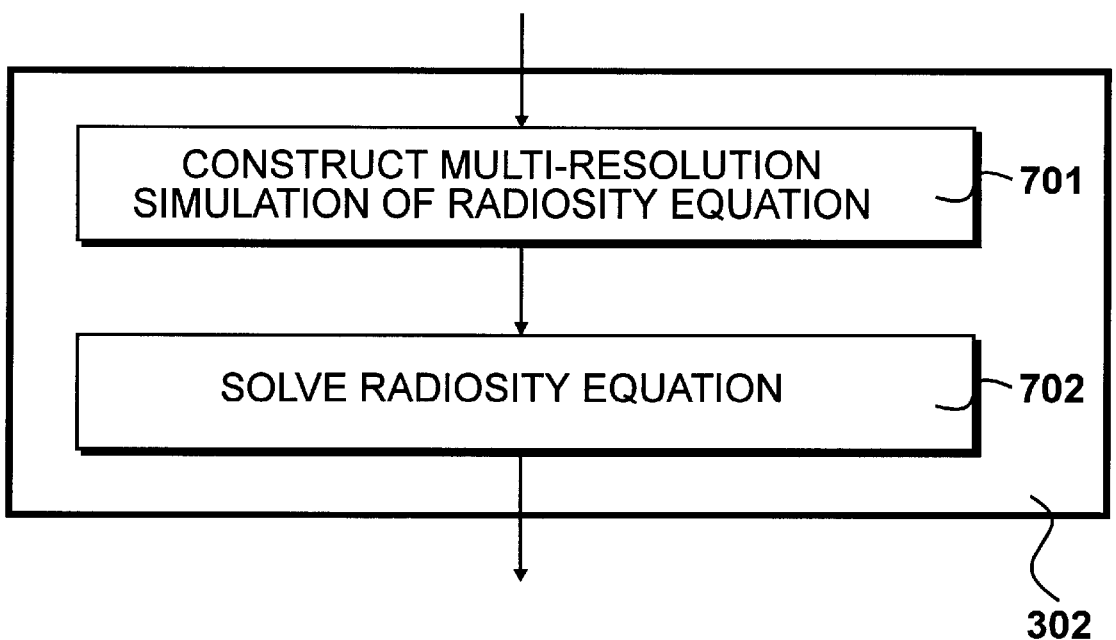
FIG. 7 details the process of radiosity simulation, shown in FIG. 3, including processes of constructing a multi-resolution representation of the radiosity equation, and solving the radiosity equation.

Procedure 302 for performing radiosity simulation is detailed in FIG. 7. At step 701 the multi-resolution representation of the radiosity equation is constructed. At step 702 the radiosity equation is solved.

Figure 8:
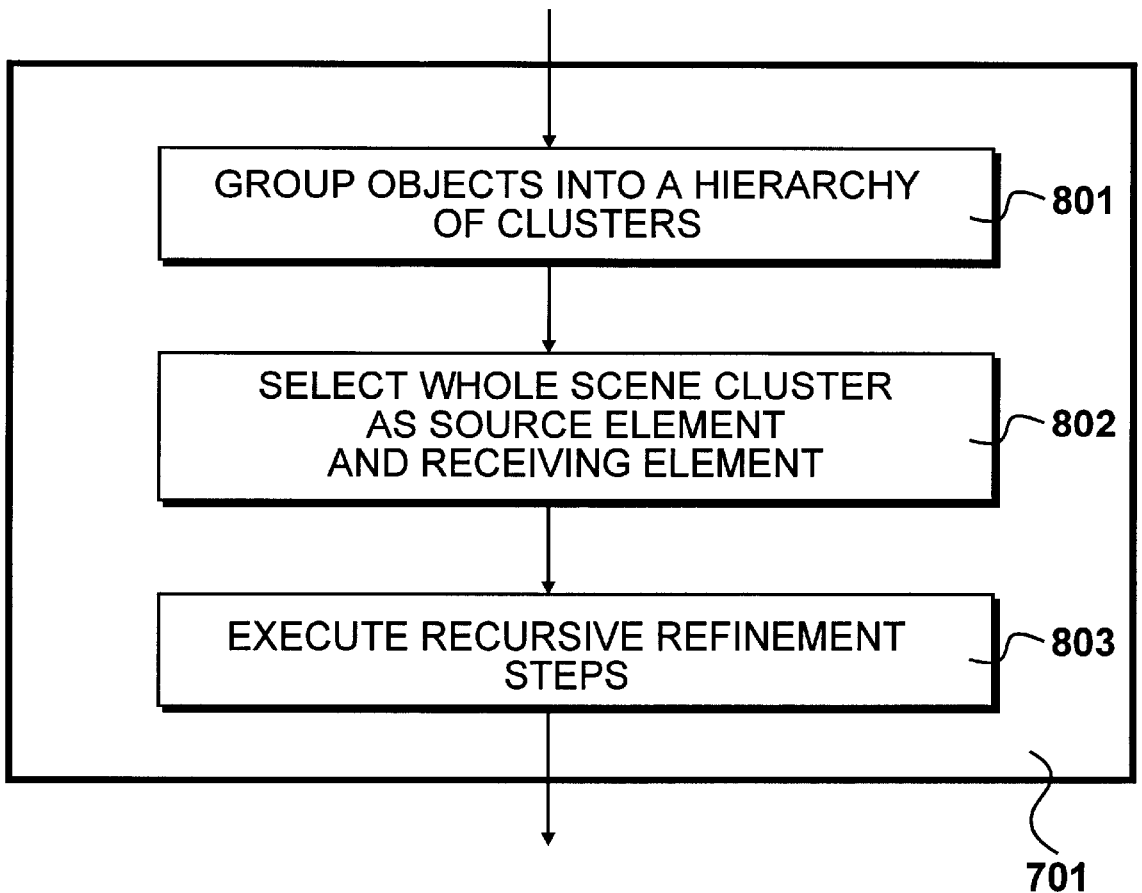
FIG. 8 details the process of constructing the multi-resolution representation of the radiosity equation shown in FIG. 7, including a process of executing refinement steps.

Procedure 701 for the construction of a multi-resolution representation of the radiosity equation is detailed in FIG. 8. At step 801 all of the scene is analysed such that a hierarchy of cluster elements is generated. At the top of this hierarchy is a cluster that represents the whole scene. Below this cluster are clusters that represent distinct groups of objects, related by their physical proximity. A method for hierarchical clustering of objects is described in "A Clustering Algorithm for Radiosity in Complex Environments", by Brian Smits, James Arvo and Donald Greenberg, Proceedings of SIGGRAPH '94, pp.435–442, 1994. The lowest level of the cluster hierarchy is the object level. Objects themselves may be considered as elements, in the same way as clusters, and the mesh elements which are created at a later stage of processing.

At step 802, the whole scene cluster at the top of the hierarchy of clusters, is selected as being both a source element and a receiving element. Thus, it is considered as transferring light onto itself. This apparently unlikely starting point is never in actual fact considered as a genuine light path. However, it serves to initiate the recursive refinement process of step 803. At step 803, the whole scene is considered initially as emitting light to itself. The recursive refinement process considers this as resulting in an excessively bad quality of light shading, and so recursively considers the component clusters and objects for light interactions. Furthermore, the recursive refinement process at step 803 creates mesh elements for the surfaces of objects wherever this is necessary in order to represent the light shading to a sufficient level of accuracy.

Figure 9:
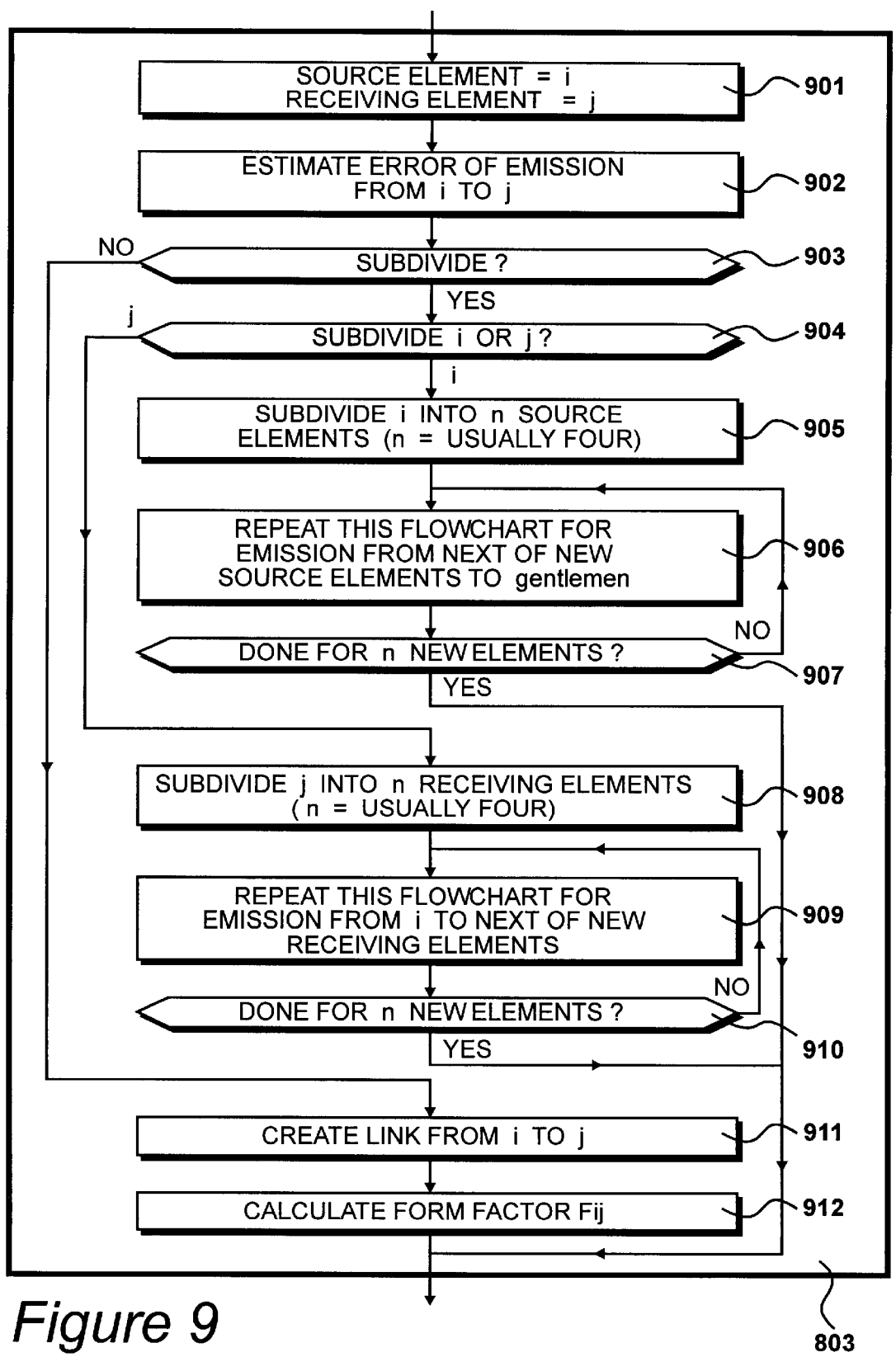
FIG. 9 details the process of executing refinement steps shown in FIG. 8.

The recursive refinement process 803 shown in FIG. 8 is detailed in FIG. 9. A source element and a receiving element will have been selected by either processes 802, or subsequent steps 906 or 909 within the same flowchart. These are now initially denoted as source element i and receiving element j at step 901. At step 902 an error is determined for the transfer of light from i to j, wherein i and j are uniformly emissive. Upon initial execution of the flowchart of FIG. 9, as indicated at step 803, the source element i and the receiving element j are both the same, and are the cluster element that represents the whole scene. Inevitably, the error determined for using this light path as the sole radiosity transaction for shading the entire scene results in a very large error in the quality of surface shading. Thus, on the first execution of the process shown in FIG. 9, as represented at step 803, the predicted error generated at step 902 will be very high.

At step 903 a question is asked as to whether a subdivision into further elements is required in order to improve the quality of the simulation. If the estimated error, calculated at step 902, is considered to be sufficiently small, subdivision is not required and the question asked at step 903 is answered in the negative. The question asked at step 903 is also answered in the negative if, within the constraints of the system, it is no longer possible to facilitate subdivision into smaller elements. Alternatively, if the error value estimated at step 902 is too high, the question asked at step 903 is answered in the affirmative.

At step 904 a question is asked as to whether it is appropriate to subdivide the source element i or to subdivide the receiving element j. Again, an error estimation approach is taken and a selection is made which results in the lowest estimated error, or the predicted highest simulation quality, being produced. If a selection is made to the effect that the source element i is to be subdivided, i is subdivided into source elements at step 905. Subdivision of a cluster results in the identification of component cluster elements, and/or component object elements. If, however, the element that is being subdivided is an object, the subdivision process at step 905 may create new elements. Typically, when a mesh is being created, this will result in the element being split up into four new elements. At subsequent levels of recursions, these mesh elements may themselves be further split, into usually four new elements, and so on, until the desired level of resolution is achieved in order to attain the required level of quality.

If an assessment is made at step 904 to the effect that the receiving element j is to be subdivided, control is directed to step 908 and a subdivision of j into receiving elements, in a similar manner, is performed at step 908.

At step 906, the processes of the flowchart shown in FIG. 9, and of which step 906 is a part, are repeated, by considering each of the newly identified element subdivisions as a source element. This step is a recursive step, and when this step is performed, at the next level of recursion, it may be understood that each of the newly identified source elements is then considered in its turn as element i, as determined at step 901. On exiting the recursive step at step 906, control is directed to step 907, where a question is asked as to whether any additional newly identified elements remain to be considered as emitters. If answered in the affirmative, control is directed back to step 906, where the next newly identified element is considered. Alternatively, all new elements have been considered. This represents the exit condition for the whole of the flowchart of FIG. 9.

Similar processes are performed at steps 908, 909 and 910, where newly identified elements are considered as receiving elements. In the recursive step 909 each newly identified receiving element is considered as receiving element j at step 901 in the next level of recursion.

Subdivisions continue to be created recursively until the question asked at step 903 is answered in the negative. At this point, a specific element has been defined as an appropriate source element and an appropriate element has been defined as a suitable receiving element. At step 911 a link is created between these elements which establishes that a transfer of light is considered as being effected between these elements for the purpose of radiosity calculations. Thereafter, at step 912, a form factor Fij is calculated representing the interaction in terms of light being transferred from the source element i to the receiving element j.

After the execution of step 912 it is likely for the procedure to be within a recursive operation. Under these circumstances, emerging from step 912 is equivalent to emerging from step 906 or step 909.

Eventually, all of the elements will have been considered from the clusters at the highest level down to the smallest newly created mesh elements. This results in links and form factors being generated across a variety of levels, for example between large clusters and small elements, between clusters, and between small mesh elements. In total, this complex network of relationships defines light interactions between all surfaces in the scene, but at levels of resolution appropriate to the level of quality that is required. Thus, less links are created when a chair cluster interacts with a distant wall cluster, than if the component objects of these clusters were to be considered, in all their combinations, as an appropriate description for light energy transfer. These links, therefore, are established between appropriate levels in the hierarchy of elements, such that interactions are only considered which result in equal to or just above the required level of image quality.

Figure 10:
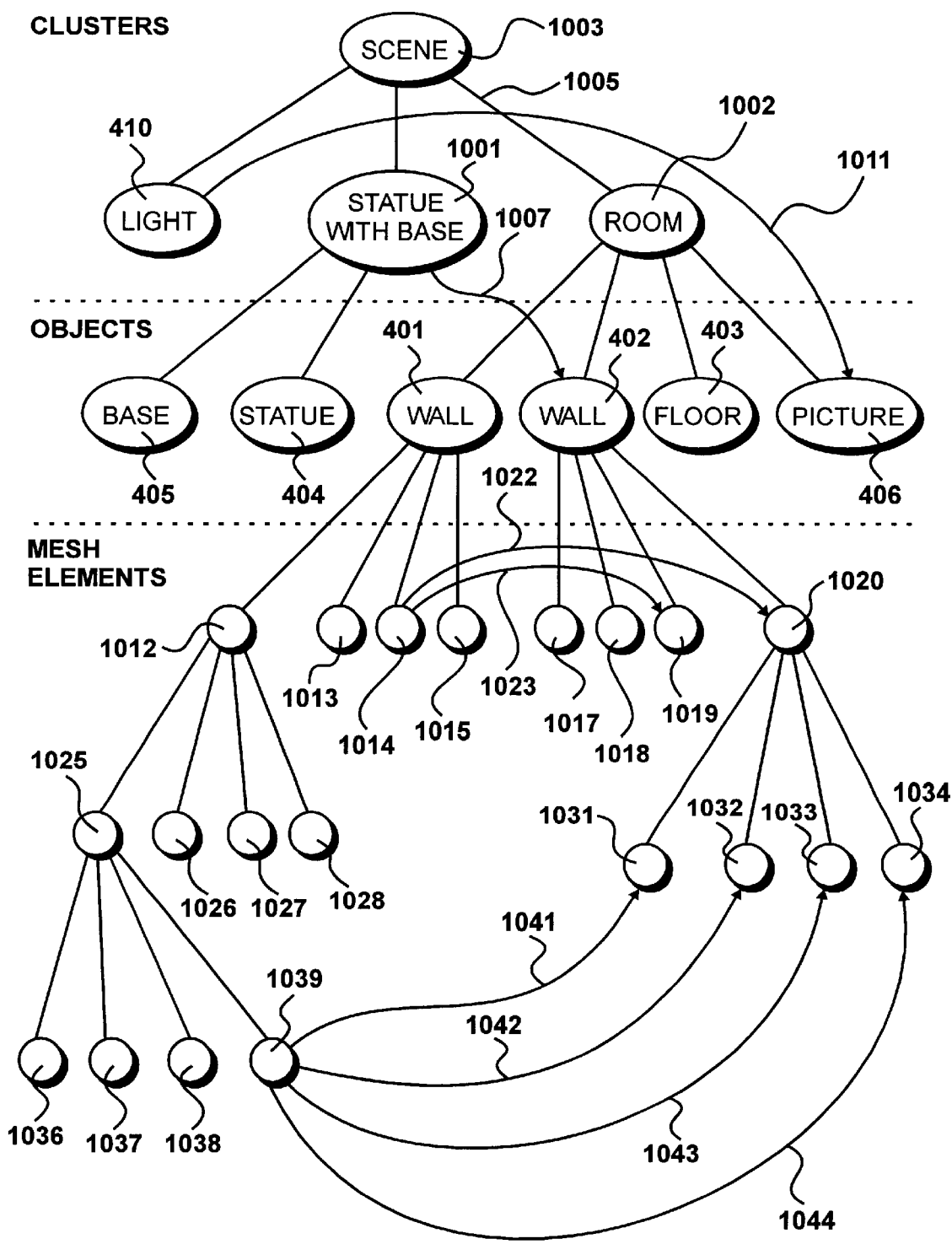
FIG. 10 illustrates data structures arising from executing the refinement process shown in FIG. 8 with respect to the objects indicated in FIG. 4.

Operations performed in accordance with the recursive procedures illustrated in FIG. 9 result in a linked structure being developed of the type represented in FIG. 10. Objects at a first level representing an object within the scene shown in FIG. 4 may be recursively subdivided into constituent elements until a level is reached at which the smallest required mesh elements are established. Objects include the statue base 405, the statue 404, the first wall 401, the second wall 402, the floor 403 and the picture 406. Within the data structure, these objects are clustered so that the base 405 and the statue 404 may be considered as a statue with base cluster 1001. Similarly, the first wall 401, the second wall 402, the floor 403 and the picture 406 are considered as a room cluster 1002. The statue with base cluster 1001 and the room cluster 1002 are then unified into a scene cluster 1003, which also includes the light source 410.

In the illustration shown in FIG. 10, straight lines, such as 1005 connecting the scene 1003 with room 1002, represent a geometric relationship between elements. Radiosity links, generated in step 911 in FIG. 9, are illustrated by curved arrowed lines, such as line 1007 illustrating an interaction between the statue and base cluster 1001 with the second wall object 402. This interaction is expressed by a form factor associated with the link that represents the amount of light transferred from the statue with base cluster 1001 to the wall 402.

The data structure illustrated in FIG. 10 does not attempt to be complete, and only shows a small fraction of the structure that would be created in order to fully represent the interactions in a typical scene such as the one shown in FIG. 4.

As an example, the recursive refinement procedure detailed in FIG. 9, will endeavour to define an interaction between the first wall 401 and the second wall 402. On this occasion, a calculated error value given at step 902 is too high for form factors to be used in terms of wall 401 transferring light to wall 402 and in terms of wall 402 reflecting light back to wall 401. Consequently, in order for the required level of quality to be achieved, it is necessary for these walls to be recursively divided into smaller elements and for the interactions to be defined in terms of appropriate element levels in preference to the interaction directly between the wall objects. The wall 401 has been subdivided into four mesh elements 1012, 1013, 1014 and 1015. Similarly, wall object 402 has been subdivided into mesh elements 1017, 1018, 1019 and 1020.

Link 1022 shows that it is possible to calculate a valid form factor with element 1014 being a source element and element 1020 being a receiving element. Similarly, link 1023 shows that it is possible to calculate a valid form factor with element 1014 as a source element and element 1019 as a receiving element. However, the required level of quality cannot be achieved if form factors are established for element 1012 as a source element and element 1020 as a receiving element. In order to generate appropriate calculations with respect to this portion of the scene, it is necessary to further recursively subdivide these elements.

Thus, when considered as a source element, element 1012 is subdivided into four elements 1025, 1026, 1027 and 1028. Similarly, as a receiving element, element 1020 is further subdivided into elements 1031, 1032, 1033 and 1034. However, further recursion has indicated that element 1025 requires further subdivision, resulting in the generation of mesh elements 1036, 1037, 1038 and 1039. At this level, it is now possible to make progress and it has been established that a form factor can be calculated with element 1039 as a source element and element 1031 as a receiving element illustrated by link 1041. Similarly, link 1042 shows that element 1039 may be a source element and element 1032 may be a receiving element. Further recursion on the receiving side is not required and element 1020 is fully satisfied as a receiving element in relation to element 1039 by links 1043 and 1044 connecting to elements 1033 and 1034 respectively.

The relationship with mesh element 1039 and elements 1031 to 1034 shows that the recursive refinement steps of FIG. 9 have been performed to a sufficient depth in order to provide the level of quality required.

FIG. 10 presents a graphical illustration of the type of data structure that is used for the multi-resolution representation of the radiosity equation. It will be understood that a true representation for a typical scene containing many thousands of objects would be impossible to present in the form of an illustration, and FIG. 10 is intended purely as an indication of data structures that are being used.

Figure 11:
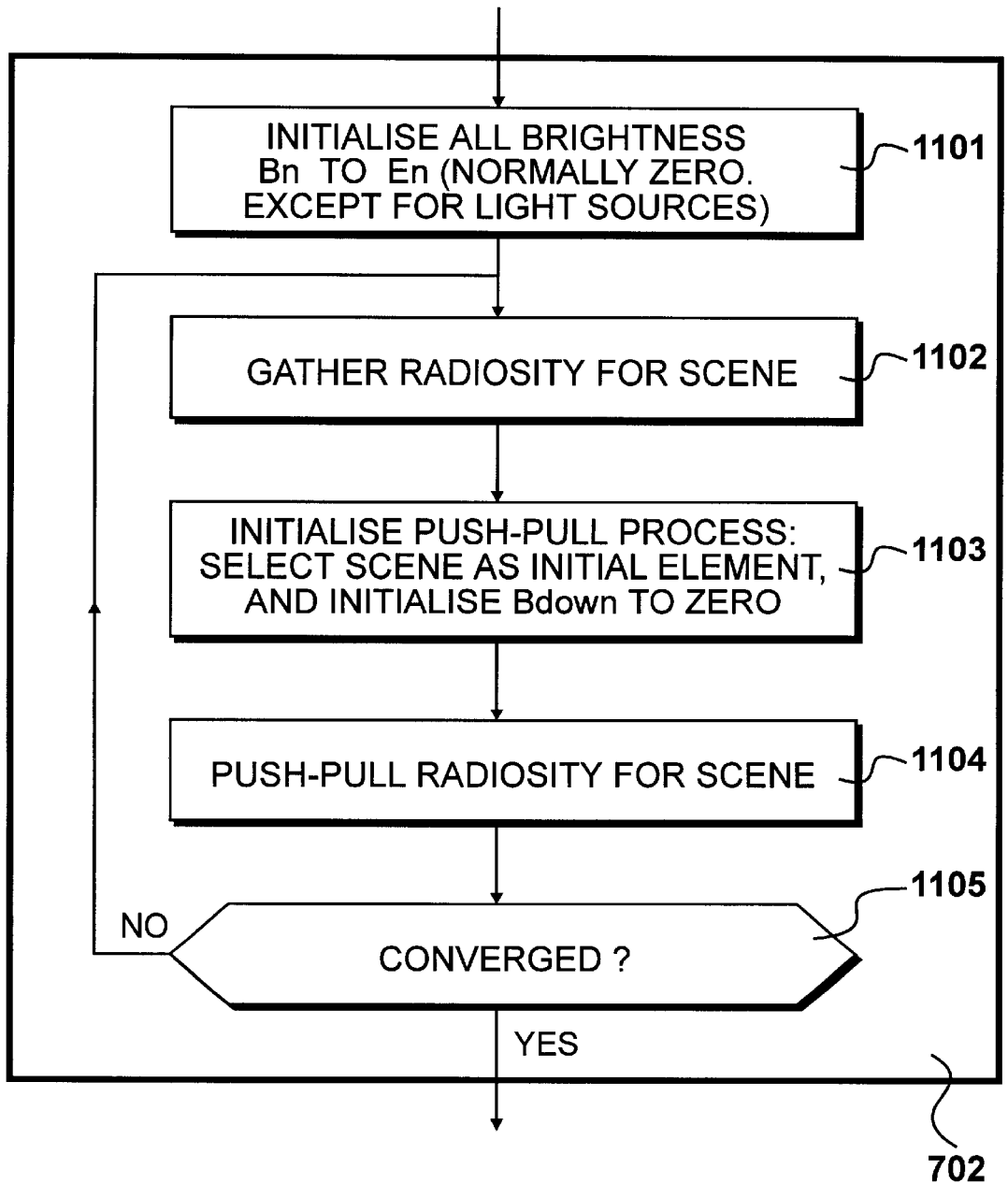
FIG. 11 details a solution for the process of solving the radiosity equation shown in FIG. 7, including a process of gathering the radiosity for the scene, and a process of push-pull radiosity for scene.

Procedure 702 for the solving of the radiosity equation is detailed in FIG. 11. Each element and object in the scene has an illumination value, and it is the purpose of the radiosity equation to determine an illumination value Bi for all n elements within the scene. The illumination values will be made up from self emissions from the elements or objects themselves, which will be zero except for light sources, in combination with contributions from other elements to which links have been constructed of the form indicated in FIG. 10.

At step 1101 all illumination values for all of the elements Bn are initialised to be equal to their self emission values En which, with the exception of the light sources, will be zero.

At step 1102 illumination contributions for the scene are gathered. For each element, incoming contributions, defined by incoming links, are summed to provide an initial illumination value. These illumination values are not complete in that incoming links occur at different levels. Thus, referring to FIG. 10, element 402 receives a contribution from element 1001 via link 1007. In addition, its sub-elements 1017 to 1020 also receive contributions from element 1014 etc such that, the gathering process identified at step 1102 will result in values being accumulated at element 402 and for example, values being gathered at element 1020. However, in reality, element 1020 represents a portion of element 402 and the illumination of element 402 should be equal to the area average of the illumination values of its sub-elements 1017 to 1020.

In order to determine accurate values for the elements, taking account of contributions made at different mesh elements levels, a push-pull radiosity procedure is performed at step 1104. In order to initiate this procedure a variable Bdown is set to zero at step 1103.

After completing the push-pull radiosity operation for the first time, processes 1102, 1103 and 1104 are repeated, such that a first iteration may be compared against a second iteration to determine the extent to which estimated illumination values are converging to a stable solution. If the difference between results of these iterations is still considered to be too large, thereby indicating that convergence has not taken place, the question to this effect is answered in the negative at step 1105, and a further iteration of steps 1102 to 1104 is repeated. The question at step 1105 is asked again and ultimately sufficient convergence should take place such that the question asked at step 1105 is answered in the affirmative. Typically eight to twelve repetitions of these steps will be required in order to reach a suitably stable set of illumination values.

Figure 12:
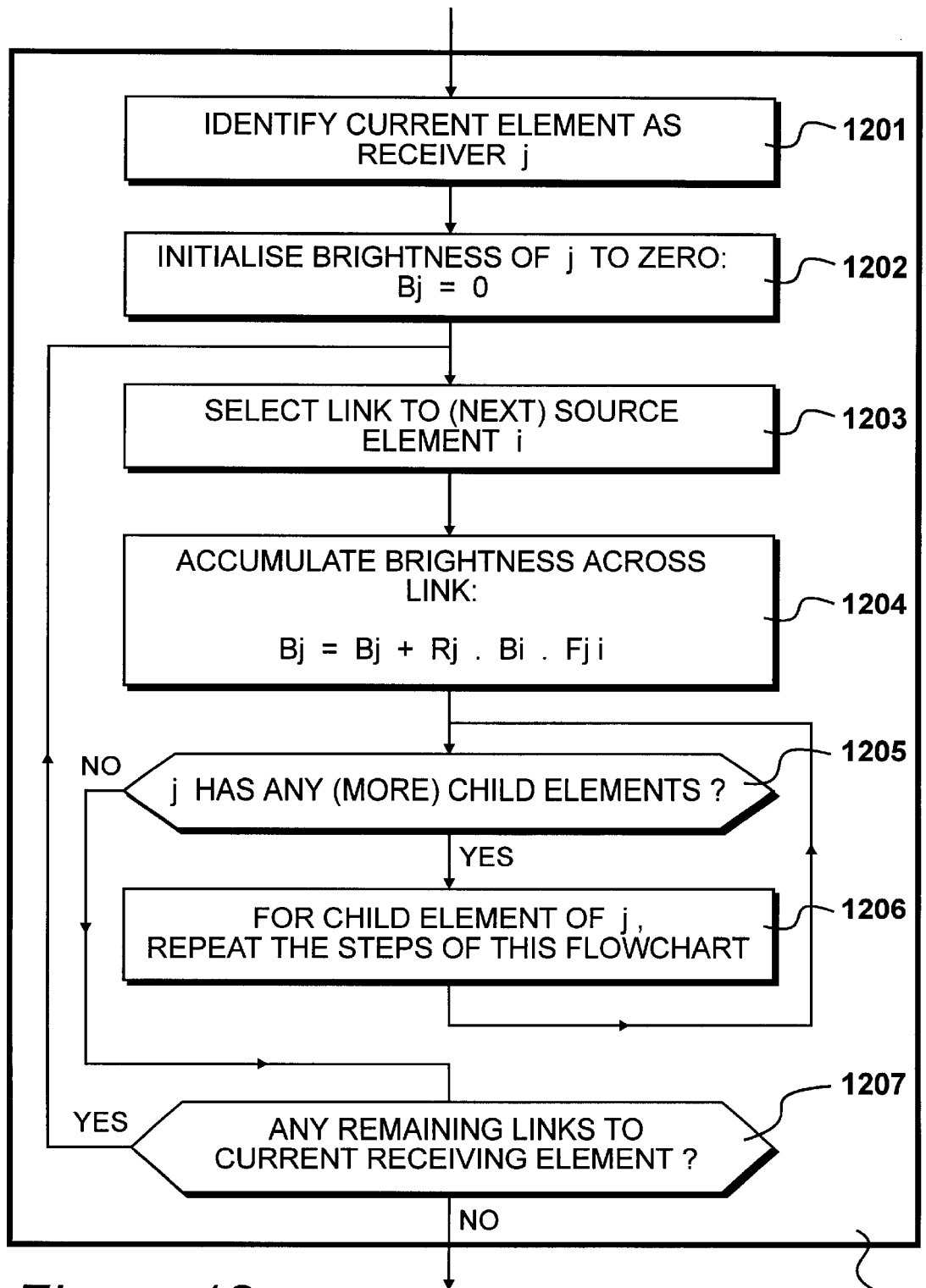
FIG. 12 details the process of gathering the radiosity for the scene shown in FIG. 11.

A known method for step 1102, gathering radiosity for the scene, shown in FIG. 11, is detailed in FIG. 12. At step 1201 a current element is identified as a receiver j and at step 1202 the illumination of j is initialised to zero.

A loop is initiated at step 1203 where the next link to a source element, identified as element i, is selected. At step 1204 the illumination across the link from element i to element j is accumulated and at step 1205 the question is asked to whether element j has any more child or subelements to be considered. If this question is answered in the affirmative, the whole procedure 1102 is recursively called at step 1206. This repeats until all of the sub-elements have been considered, whereafter at step 1207 a question is asked as to whether any remaining links to the current receiving element are present. When answered in the affirmative, control is returned to step 1203 and the next link to the receiving element j is selected.

Figure 13:
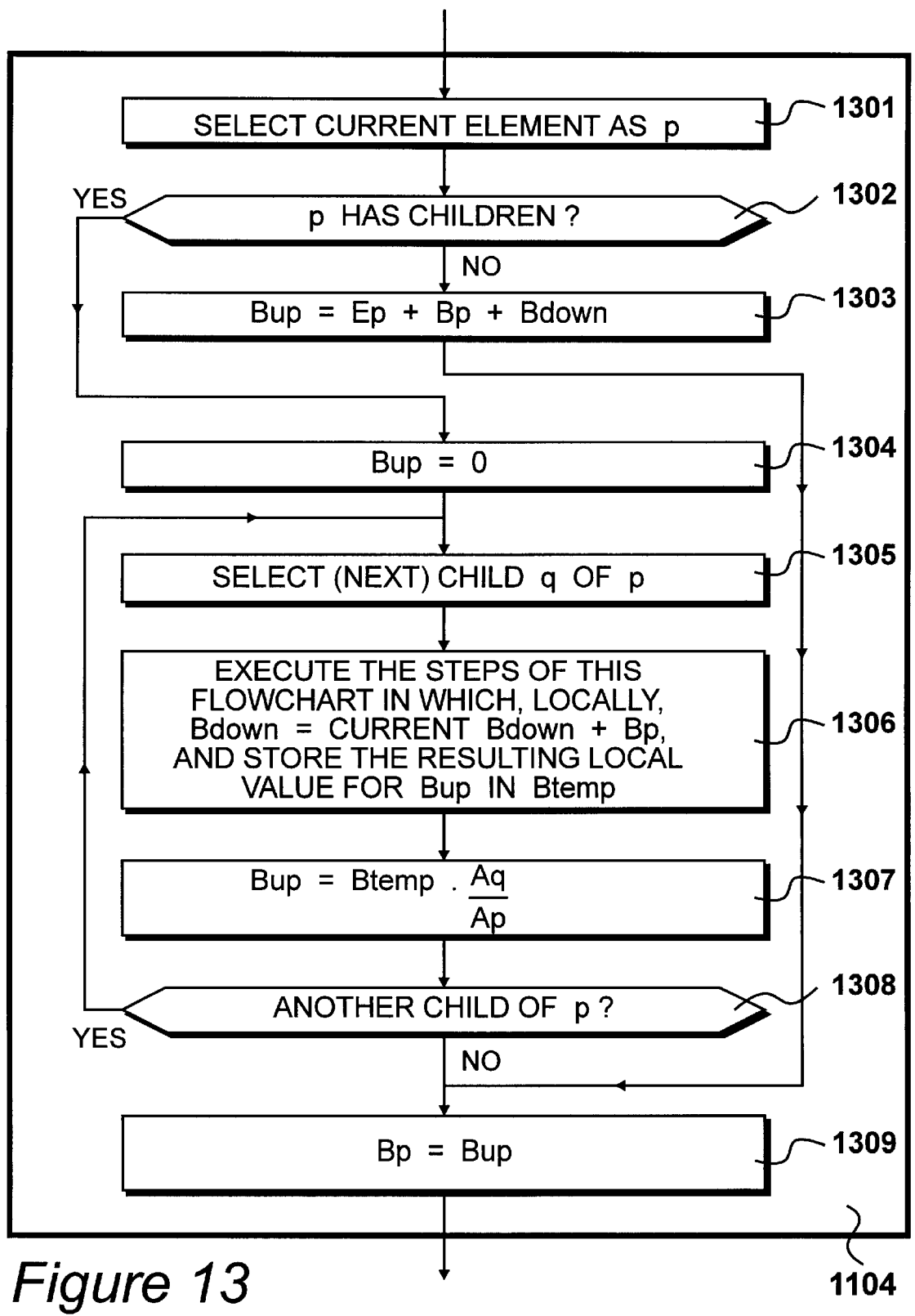
FIG. 13 details the process of push-pull radiosity for the scene shown in FIG. 11.

A known procedure for step 1103, the push-pull process for the illumination in the scene, shown in FIG. 11 is detailed in FIG. 13. At step 1301 the current element is considered as p and on the first loop the current element will be that of the highest level of the structure shown in FIG. 10 which, in this example, would be the whole scene represented by cluster 1003. At step 1302 a question is asked as to whether p, selected at step 1301, has child elements and when answered in the affirmative control is directed to step 1304. At step 1304 a variable Bup is set equal to zero, whereafter at step 1305 a next child q of selected element p is selected.

Thereafter, the whole of the procedure shown in FIG. 3 is recursively executed at step 1306. Within the execution of the recursive step, a local value for Bdown is set equal to the current value for Bdown plus Bp, that is the illumination gathered directly at the parent element p. The result, in terms of a local value for Bup is stored in variable Btemp. Thereafter, control is directed to step 1307.

At step 1307 variable Bup is set equal to value Btemp, the local value determined by the recursive call to procedure 1306, which is then multiplied by the area of the child divided by the area of the parent to compute an area average.

At step 1308 a question is asked as to whether another child of p is present and when answered in the affirmative, control is directed back to step 1305. When all of the children have been considered, the question asked at step 1308 will be answered in the negative and control is directed to step 1309, resulting in a new value for Bp being set equal to Bup. When the question asked at step 1302 is answered in the negative, to the effect that the current element p does not have any children, Bup is set equal to Ep, the self emission value for element p, plus Bp plus Bdown, and control is directed to step 1309.

In an alternative embodiment, the steps shown in FIG. 7 are performed iteratively, as part of a loop. The purpose of this is to facilitate a more accurate determination of error values, upon which decisions are made about the level of meshing that is to be performed. In the iterative process, during the first pass of the steps shown in FIG. 7, at step 701, the multi-resolution representation is constructed for a first error tolerance, eps__1, and then at step 702, the radiosity equation is solved to yield a first solution. On the next iteration, the error tolerance is reduced, to eps__2. However, the multi-resolution representation constructed at step 701 in the previous iteration is already valid down to the eps__1 level of error tolerance. Thus, to continue to the reduced level of error tolerance, given as eps__2, the pre-existing multi-resolution representation can be continued by further addition of mesh elements and establishing links, thus there is no wastage in having to recalculate existing data structures. A third and additional iterations may then be performed.

A first purpose of this multi-pass method is to enable a rough display of the radiosity solution to be previewed more quickly than if the fully detailed solution is created in one stage. It is possible, then, for an operator to identify obvious deficiencies at an early stage. A further advantage is that the first, or early solutions, provide subsequent solutions with information about the magnitude of light transferred across links, and not just the magnitude of the form factor. This information can be used to improve the accuracy by which errors are predicted, such that even pairs of surfaces with large form factors do not need to be respectively meshed, if the actual light that would be transferred across those links is insignificant. This form of iterative refinement is known as BF refinement.

Figure 14:
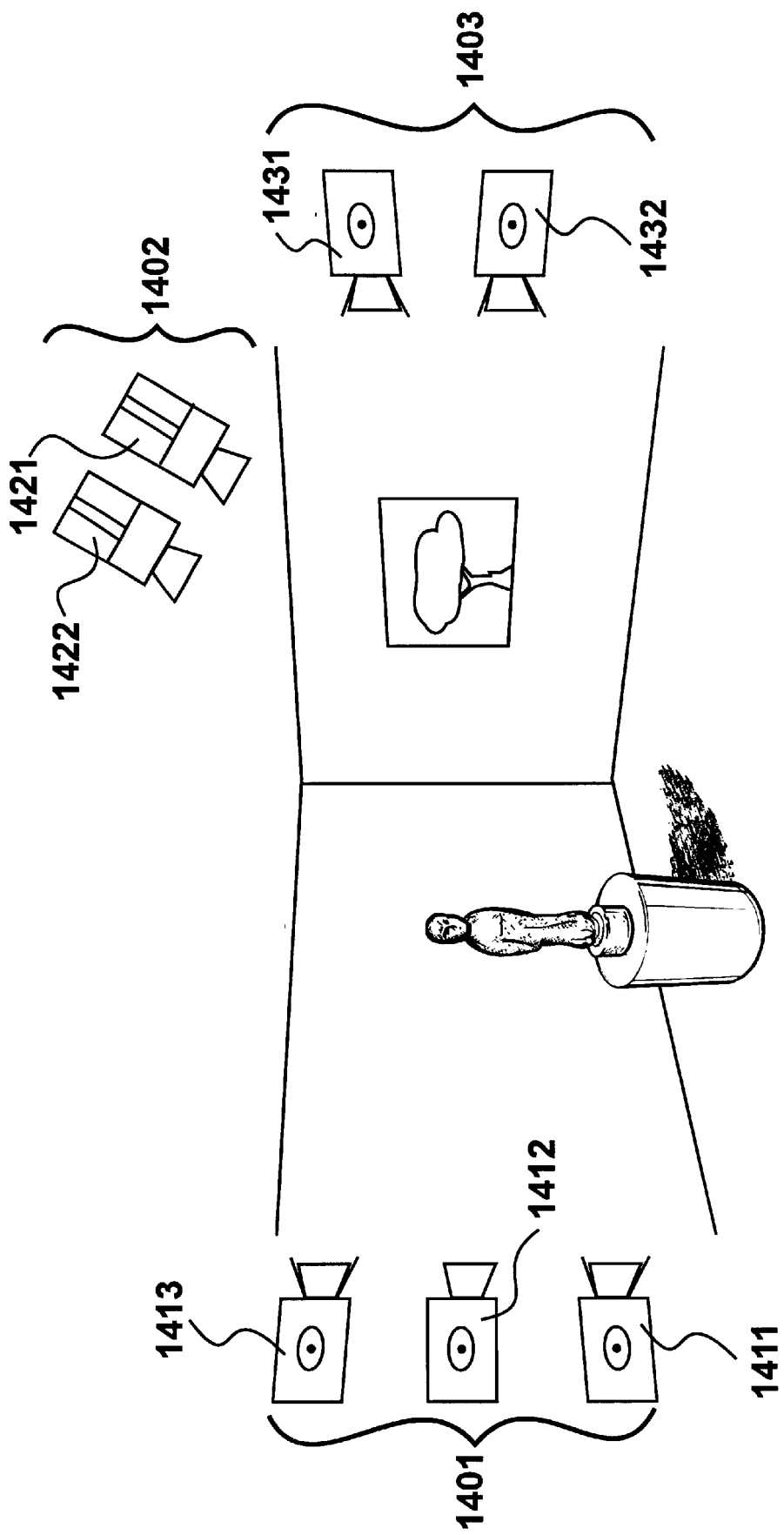
FIG. 14 details an image of a virtual scene including three light banks.

The construction of the scene shown in FIG. 4 is further detailed in FIG. 14. Three light banks 1401, 1402 and 1403 exist within the virtual scene in order to provide light sources of varying intensity for objects in the scene. The first light bank 1401 comprises three light sources 1411, 1412, and 1413. Each of these light sources may have different color or spectral characteristics, as defined by the combination of the spectral power distribution of the light source and the spectral transmission curve of a colored filter which can be put in front of the light source. Also, each light source may have a different intensity, different directional distribution, different location and orientation. The positional characteristics of the several light sources in a light bank, although different, are fixed. The relative intensities and spectral characteristics of the light sources within an individual light bank are also fixed.

However, when treated as a whole, the overall intensity of a light bank may be changed independently with respect to other light banks. Furthermore, the characteristic of each light bank may be continuously varied with respect to the magnitude of red, green and blue color components. As well as providing control over color generally, this feature may be used to shift the spectral power distribution towards blue as the power of the light bank is increased, as occurs with real incandescent light sources.

The relationship among the spectral power distributions of the light sources in a given light bank is fixed. Thus, for any given wavelength, the ratio of the power emitted at that wavelength by a light source to the power emitted by any other light source within the same light bank, will remain constant even when the fader associated with that light bank changes.

For example, if a light bank has its intensity controlled by a console fader moving between zero and one hundred percent of its travel, and light sources 1411, 1412 and 1413 have been fixed in an intensity ratio of 50:5:1 respectively, this ratio of intensities will remain constant for any color or wavelength at all settings of the console fader. Another set of faders may be used to modify the spectral power distribution, in a simple example, by controlling red, green and blue for the light bank. Modifications to the relative amplitudes of red, green and blue are made in equal proportion to each light source within the light bank.

Although drawn as real spotlights, the light sources shown in FIG. 14 do not need to be modelled in any detail unless they are to be shown themselves as objects in a rendered scene. Therefore, a simpler construction of light source would usually be present within a scene. However, for the purposes of this explanation, the light sources are shown as four models of spotlights of the type found in real studios.

Light bank 1402 comprises light sources 1421 and 1422. Light bank 1403 comprises light sources 1431 and 1432. Again, the characteristics of light sources within each of these light banks 1302 and 1303 may be different, but their light intensity is varied in a strict ratio. The three light banks 1401, 1402 and 1403 may be freely controlled in response to real-time signals indicating the respective amplitudes of each of the three light banks. Although the relative light intensity of light sources within a light bank is fixed to a specific ratio prior to radiosity simulation, at the time of radiosity rendering it is possible to vary the relative intensity of the light banks with respect to each other.

As is known, radiosity simulations may be performed for each of the light banks in turn, resulting in three sets of scene illumination data. The first set of scene illumination data corresponds to the scene illuminated with light bank 1401 at maximum intensity and light banks 1402 and 1403 at zero intensity. The second radiosity simulation is performed with light bank 1401 at zero intensity, light bank 1402 at maximum intensity and light bank 1403 at zero intensity. The third radiosity simulation is performed with light banks 1401 and 1402 at zero intensity, and light bank 1403 at maximum intensity. The three simulation results may be combined linearly in response to a particular required intensity setting for each of the respective light banks, with the overall intensities for each of red, green or blue also being independently controllable for each light bank. Thus, during the process of radiosity rendering 305, shown in FIG. 3, a linear combination of scene illumination data is performed in response to required light bank intensity settings. This linear combination process is not computationally intensive, requiring only multiply accumulation of data from each of the three light bank illumination simulations. This approach is described in the aforementioned reference, "Interactive Design of Complex Time-Dependent Lighting".

A problem with this approach is that the time taken to set up the scene illumination data for each of the light banks is considerable, because a full radiosity simulation has to be performed for each light bank.

An improved method of the step of radiosity simulation 302 shown in FIG. 3 and previously described with reference to FIG. 7, is detailed in FIG. 15. At step 1501 all light banks are set at maximum intensity, and the multi-resolution simulation of the radiosity equation is constructed. Maximum intensity is used, because the process of sub-dividing object surfaces into mesh elements is performed in response to error estimation processes, which take into account the amount of light that is being transferred. Furthermore, in BF refinement, the amiunt of light reflected between surfaces is further used to improve efficiency of the multi-resolution simulation of the radiosity equation, so that it takes up less memory and takes less time to solve. Thus, by setting all the light banks to maximum intensity, the full details of the scene will be represented to the maximum mesh element resolution that will be required for any possible combination of light bank settings.

At step 1502 the first light bank is selected, and the intensity for this light bank is set to maximum. The intensities for the other light banks are all set to zero. At step 1503 the radiosity equation is solved for the simulation containing light intensities based upon the scene illuminated by the first light bank only. The scene illumination data is stored in association with the first light bank.

At step 1504 a question is asked as to whether another light bank is to be considered. If answered in the affirmative, control is directed back to step 1502. Thereafter, the second light bank is selected at step 1502, and the radiosity equation is solved for that light bank at step 1503. Steps 1502 and 1503 are repeated for any remaining light banks, whereafter the question asked at step 1504 will be answered in the negative, concluding the steps for the process of radiosity simulation 302.

At step 1502 RGB values for each light bank are selected for the respective light bank at maximum intensity. Radiosity equations for respective red, green and blue components for each of the elements in the scene are shown in FIG. 16. The classical radiosity equation for determining the illumination of an element, shown originally in FIG. 5D, is performed three times, each with respect to red, green and blue components for all elements within the scene. Thus, the equation shown at 1601 in FIG. 16 represents the classical radiosity equation with respect to the red colour component. Equation 1602 is the classical radiosity equation with respect to the green component and equation 1603 is the classical radiosity equation with respect to the blue component. The equations shown at FIG. 16 are used when solving the radiosity equation at step 1503 shown in FIG. 15. Step 1503 is further detailed in FIG. 8 and subsequent figures, as has already been described for the known process of radiosity simulation.

Figure 15:
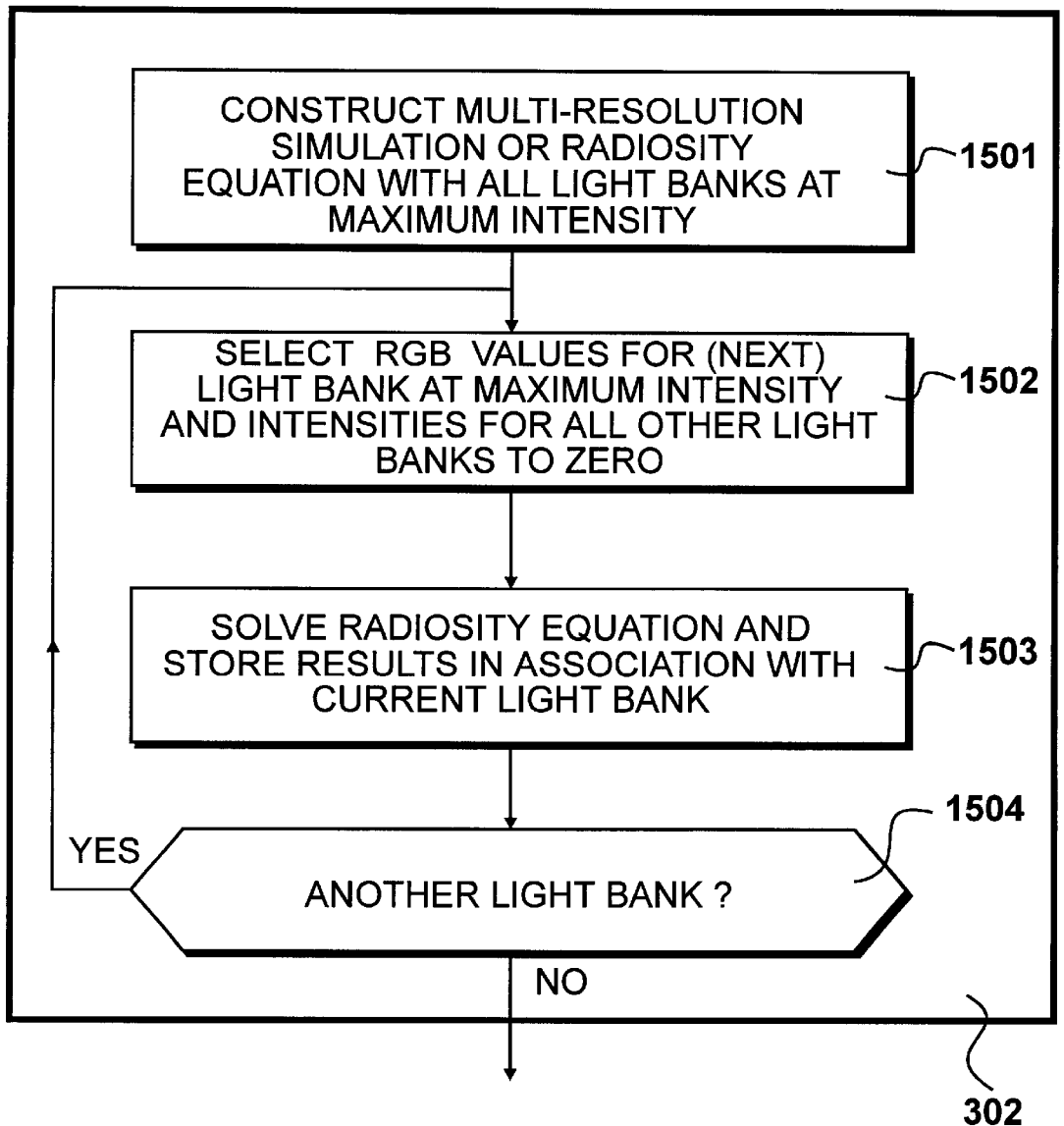
FIG. 15 details the process of radiosity simulation in accordance with the present invention.

As can be seen from FIG. 15, the present invention enables radiosity solutions to be obtained for multiple light banks without the need for repeating the time consuming process of constructing the multi-resolution simulation of the radiosity equation. By setting all of the light banks to maximum intensity when constructing the multi-resolution simulation of the radiosity equation at step 1501, a radiosity equation is constructed that is appropriate for any linear combination of light bank intensities. Thus, it becomes unnecessary to repeat step 1501, and the only step that needs to be repeated is the step of solving the radiosity equation for each light bank, shown at step 1503. This step is considerably less time consuming than step 1501. Furthermore, the invention does not reduce the quality of the resulting lighting simulations in any way, but still provides a very significant improvement in speed when constructing a new radiosity simulation.

Figure 17:
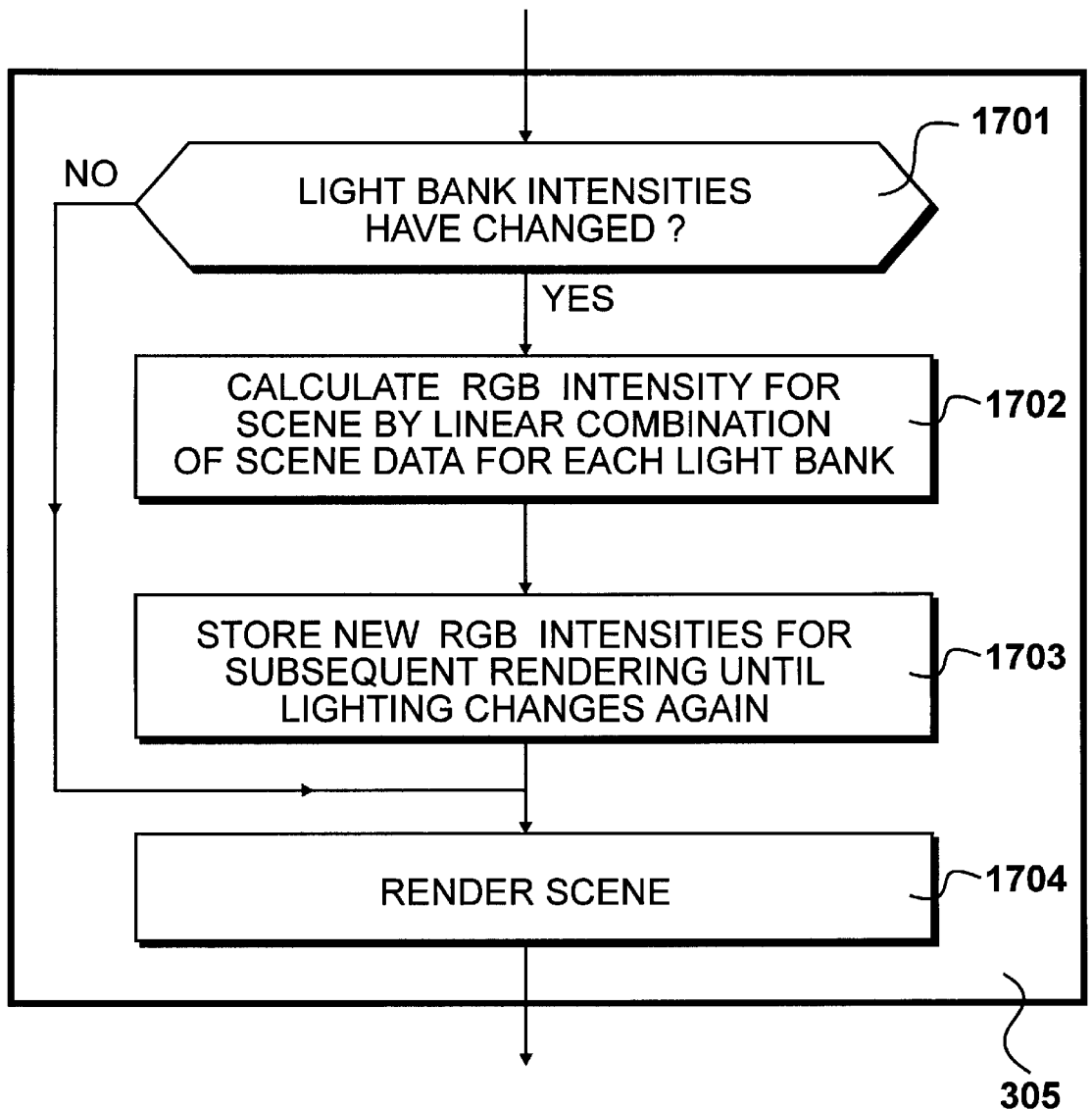
FIG. 17 details the process of radiosity rendering as performed in accordance with the present invention, including a step of linear combination of scene data.

The process of radiosity rendering for light banks of varying intensity, indicated at step 305 in FIG. 3, is detailed in FIG. 17. At step 1701 a question is asked as to whether any of the light bank intensities have changed. If answered in the negative, control is directed to step 1704, where the scene is rendered in accordance with the pre-existing light bank settings. Alternatively, if the question asked at step 1701 is answered in the affirmative, control is directed to step 1702. At step 1702 a calculation is made of the RGB intensity for the scene by a linear combination of scene data for each light bank. At step 1703 the RGB intensity is calculated at step 1702 and is stored for subsequent rendering until light bank intensities change again. Thereafter, the scene is rendered at step 1704. Thus, the recalculation at step 1702 is only performed when a change has been made in the light intensities of any of the light banks.

The calculation of the RGB intensity for the scene by a linear combination of scene data for each light bank, shown at step 1702, is detailed in FIG. 18. In FIG. 18 the brightness Bi for an element i is shown to be equal to the sum of the products of the control amplitude Ck for lighting bank k, and the pre-calculated brightness Bik of element i, when light bank k is at maximum intensity. This equation is repeated for each of the colour components, R, G and B. Each of R, G and B has separate values for Ck, thus providing an overall color control for each light bank.

The control amplitude Ck may be derived from a real physical control fader position on a lighting console, that has been digitised in real time by analogue to digital conversion. Alternatively a virtual fader position may be used, that is derived from a graphical user interface on an operating console. Another alternative is that the fader position value is established from pre-recorded fader adjustments that vary over time, or that are generated automatically in response to fader instructions at a lighting console, for example, a slow-fade-to-zero-intensity command.

Applications requiring high spectral accuracy, can carry out the radiosity simulation in the spectral domain rather than in the RGB color space. Rather than using an RGB color for a surface material, in an alternative embodiment of the present invention, these applications would use a spectral reflectance curve, describing the reflective properties of the material as a function of wavelength in the visible spectrum. Similarly, the spectral character of a light source would be described by its spectral power distribution, expressing the emission of the source as a function of wavelength. In general, these spectral curves are obtained through measurements and are approximated using a set of point samples taken at specific wavelengths. For example, the spectral power distribution of a light source could be accurately captured by measuring its emission at a set of wavelengths spaced 5 nanometres apart and covering the range from 380 nanometres to 780 nanometres. This process would result in a sequence of 81 values and would significantly increase memory usage.

A similar process to that used for the separation of the illumination according to a set of light banks can be used to compute a spectral solution of any resolution without increasing the memory requirements of the radiosity simulation step 302.

Figure 19:
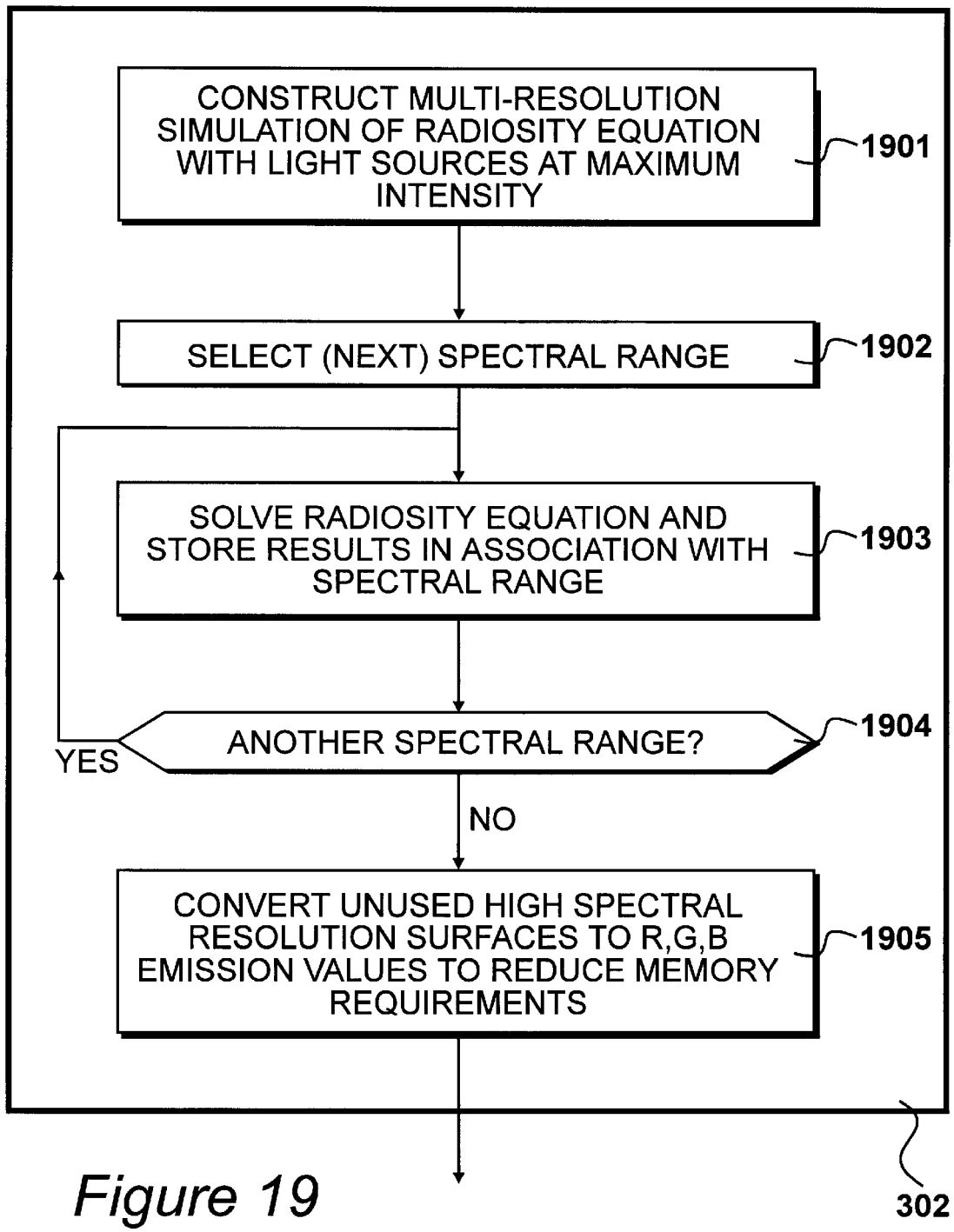
FIG. 19 details an alternative embodiment of the invention for the process of radiosity simulation as shown in FIG. 3.

The high spectral resolution embodiment for the radiosity simulation 302, is summarised in the flowchart shown in FIG. 19. At step 1901 all light sources and materials in the scene are described in terms of their average brightness emission value over the emission spectrum, and the multi-resolution simulation of the radiosity equation is constructed. At step 1902 the first spectral band is selected and thereafter all materials and light sources are considered with respect to the selected band. At step 1903 the radiosity equation is solved and stored in association with the respective spectral band.

At step 1904 a question is asked as to whether another spectral band is to be considered. In the present example, where a total of eighty-one spectral bands are being used, another 80 bands need to be considered. Therefore, on the first pass, control will be directed back from step 1904 to step 1902, where the second spectral band will be considered. Steps 1902, 1903, and 1904 are repeated until all 81 spectral bands are solved and the question at 1904 is answered in the negative.

The resulting data may be queried to obtain spectral measurements at particular points in the scene or the date may be converted to a particular color space for display, for example NTSC RGB for recording on video tape, as indicated at step 1906.

The multi-resolution simulation of the radiosity equation, as illustrated by way of the simple example shown in FIG. 10, proceeds in construction by storing data for red, green and blue emission values. This use of triplets of color values may be advantageously adapted to improve the method for obtaining an increased spectral resolution radiosity simulation. In this additional alternative embodiment, step 1901 of constructing the radiosity equation with light sources at maximum intensity is modified to be performed with light sources set at the intensity required for the current level of scene illumination. The radiosity equation is then constructed using three spectral bands, representing three equally divided non-overlapping ranges of the visible spectrum. These three ranges are roughly analogous to red, green and blue, that are generally defined as weighted integrals of overlapping spectral curves. The reflectance curves of the materials and Bight sources in the scene are averaged to obtain a characteristic over each of the three spectral bands. These characteristics are used when constructing a multi-resolution representation of the radiosity equation at step 1901. This makes construction of the radiosity equation more responsive to the particular spectral characteristics of the scene that is to be simulated. Thereafter, a high level of spectral resolution is used when solving the radiosity equation. In the present example, material reflectance and emission characteristics are stored as spectral distribution curves having eighty-one samples, and the radiosity equation is solved eighty-one times, once for each spectral sample.

In a further alternative embodiment, given that data structures are present for storing three spectral bands at a time, steps 1902 to 1904 may be iterated three bands at a time, resulting in a loop that is repeated twenty-seven times when eighty-one spectral samples are being used.

Figure 20:
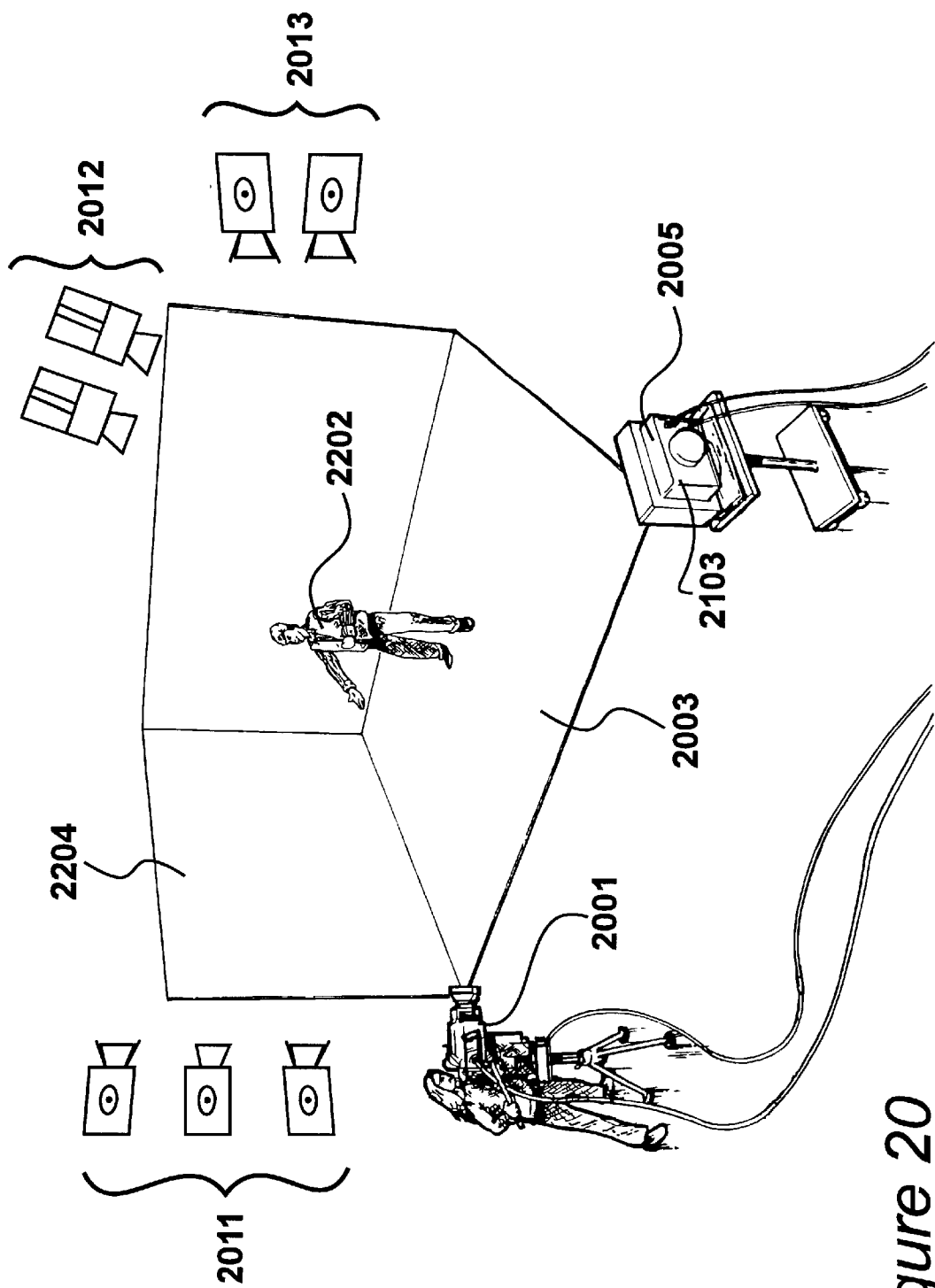
FIG. 20 shows a virtual set, for generating live video data.

The artificial scene shown in FIG. 4 may be combined with images from a real studio, such that artificial objects, walls and studio features may be superimposed upon a real studio in which minimal features are present. Furthermore, virtual light banks 1401,1402 and 1403 may correspond to real light banks within a virtual set. Such a virtual set is illustrated in FIG. 20. A camera 2001 generates live video image data as well as serial positioning data and lens data. The camera is aimed at talent 2002, located in the centre of a blue screen environment, comprising a blue floor 2003 and blue walls 2004. The blue colour of the walls is carefully controlled and calibrated in such a way as to facilitate automatic replacement of any blue areas of the subsequently processed camera images with a corresponding virtual image. A monitor 2005 facilitates visual feedback for talent 2002, to facilitate interaction with the virtual image.

Also present in the virtual set are real light sources, including light bank 2011, light bank 2012 and light bank 2013. Light bank 2011 corresponds to the virtual light bank 1401, real light bank 2012 corresponds to the virtual light bank 1402 and real light bank 2013 corresponds to the virtual light bank 1403.

Figure 21:
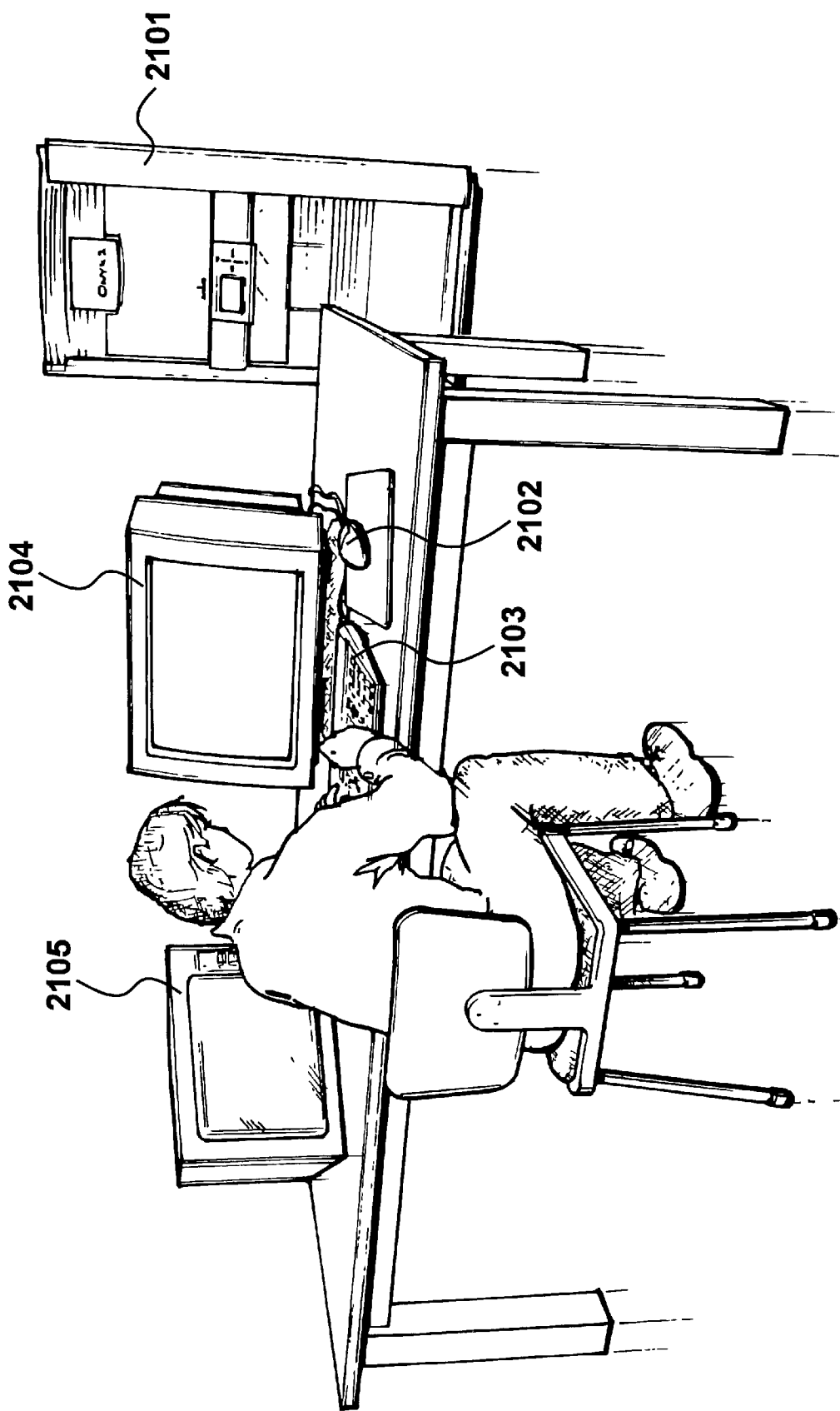
FIG. 21 details equipment for combining camera data with scene data in real-time.

Equipment for compositing image data from the virtual set shown in FIG. 20 with artificial scene images such as the one shown in FIG. 14, is detailed in FIG. 21. A main processor 2101, such as an Onyx2™, manufactured by Silicon Graphics Inc, receives image and position data signals from the camera 2001 shown in FIG. 20. The position information from the camera, together with lens data including zoom and focus, enable a calculation to be made of the viewpoint of the camera with respect of the virtual set. The walls of the virtual set are calibrated in position, so that at least one of either the floor or the two walls may be used as a reference plane that will match with a corresponding floor or wall plane in the artificial scene shown at FIG. 14. Commands for controlling the virtual environment are performed by the operator using a mouse 2005, a keyboard 2004 and a monitor 2002. A high quality broadcast monitor 2003 is also provided on which to view the results of a compositing process.

The operator has control over such parameters as blue screen removal, floor plane or wall plane colour, quality control and ensuring that calibrations are maintained. The main processor 2001 renders the scene shown in FIG. 14 in accordance with the radiosity simulation process shown in FIG. 15. Once this has been performed, it then becomes possible to render the scene from any viewpoint, and in accordance with the process shown in FIG. 17. In a virtual set the viewpoint is defined by the camera position and lens conditions. Thus, the main processor 2001 performs radiosity rendering in response to data from camera 2001. The rendered scene is then keyed with the real video data using a blue screen keyer process, such that talent 2002 appears to be in a highly realistic scene, including the objects shown in FIG. 14.

The operator shown in FIG. 21 further has control over lighting conditions. Thus, a fader signal is used to determine the light intensity of light bank 2011. The same fader signal is supplied to the virtual scene rendering step 305, in order to determine the intensity of the virtual light bank 1401. A similar link is made between the intensity of the real light bank 2012 with the virtual light bank 1402 and the real light bank 2013 with the virtual light bank 1403. Thus, changes in intensity of lighting that are produced as a result of manipulating light bank intensities are reflected in real objects in the virtual set, as well as those created as part of a virtual scene. This linkage of lighting effects may be performed in real-time, due to the efficiency of the process shown in FIG. 17.

The invention provides an extremely efficient setting-up procedure, in which a radiosity simulation is defined, such that, should it be necessary, changes in position of the real light banks 2211, 2212 and 2213, which are then reflected by changes to the position in the virtual light banks 1401, 1402 and 1403 respectively, can be taken into account with a high degree of efficiency. The invention provides an improved method of operating a virtual set, wherein real and virtual images are combined, such that variations in real and corresponding virtual light sources may be taken into account without the need for reconstructing the multi-resolution simulation of the radiosity equation for each light bank.

What I claim is:

1. A method of generating image data from scene data, wherein said scene data includes surfaces and a plurality of light banks, comprising:
    setting the light banks at a maximum intensity;
    constructing a multi-resolution representation of a radiosity equation with respect to said scene data; and
    solving said radiosity equation individually for each of said light banks, wherein a light bank for which a solution is being sought is switched on with the remaining light banks being switched off.

2. A method according to claim 1, wherein scene emission data is stored separately for each solution of said radiosity equation.

3. A method according to claim 1, wherein solutions of said radiosity equation are combined in response to a change in a required light bank intensity.

4. A method according to claim 1, wherein solutions of said radiosity equation are combined in response to a change in a required light bank color.

5. A method according to claim 3, wherein said light bank requests change in real time.

6. A method according to claim 5, wherein said light bank requirements are determined in response to manually operated lighting control faders.

7. A method according to claim 5, wherein said light bank requirements are determined in response to data recorded from manually operated lighting control faders.

8. A method according to claim 5, wherein said light bank requirements are determined in response to data from a virtual set.

9. A method of generating image data from scene data, wherein said scene data comprises a plurality of light sources and surfaces having emission and reflectivity characteristics represented at a spectral resolution defined by a plurality of spectral ranges, the method comprising:

setting the plurality of light sources at a maximum intensity;

constructing a multi-resolution representation of the radiosity equation for said scene;

solving said radiosity equation individually for each of said plurality of spectral ranges;

combining solutions of said radiosity equation; and storing emission characteristics for selected surfaces at a reduced spectral resolution.

10. Apparatus for generating image data from scene data, comprising processing means, and storage means for storing said scene data and instructions for said processing means, wherein said scene data includes surfaces and a plurality of light banks; and said instructions are configurable to control said processing means to perform a method comprising:

setting the light banks at a maximum intensity;

constructing a multi-resolution representation of a radiosity equation for said scene; and solving said radiosity equation individually for each of said light banks, wherein a light bank for which a solution is being sought is switched on with the remaining light banks being switched off.

11. Apparatus according to claim 10, wherein said storage means stores emission data separately for each solution of said radiosity equation.

12. Apparatus according to claim 10, configurable to combine solutions of said radiosity equation in response to changes in a request for a light bank intensity.

13. Apparatus according to claim 10, configurable to combine solutions of said radiosity equation in response to a change in a request for a light bank color.

14. Apparatus according to claim 12, wherein said light bank requests changes in real time.

15. Apparatus according to claim 14, wherein said light bank changes are determined in response to lighting control faders.

16. Apparatus according to claim 14, wherein said light bank changes are determined in response to data recorded from manually operated lighting control faders.

17. Apparatus according to claim 14, wherein said light bank changes are determined in response to data from a virtual set.

18. Apparatus for generating image data from scene data, comprising processing means, and storage means for storing said scene data and instructions for said processing means, wherein said scene data comprises a plurality of light sources and surfaces having elmission and or reflectivity characteristics represented at a spectral resolution defined by a plurality of spectral ranges; and said instructions are configurable to control said processing means to perform a method comprising:

setting the light banks at a maximum intensity;

constructing a multi-resolution representation of the radiosity equation for said scene;

solving said radiosity equation individually for each of said plurality of spectral ranges;

combining solutions of said radiosity equation; and storing emission characteristics for selected surfaces at a reduced spectral resolution.

19. A virtual set in which real foreground images are combined with synthesised background images in real time, comprising apparatus for generating image data from scene data, processing means, and storage means for storing said scene data and instructions for said processing means, wherein said scene data comprises surfaces and a plurality of light banks; and said instructions are configurable to control said processing means to perform a method comprising:

setting the light banks at a maximum intensity;

constructing a multi-resolution representation of a radiosity equation for said scene; and solving said radiosity equation individually for each of said light banks, wherein a light bank for which a solution is being sought is switched on with the remaining light banks being switched off.

20. A virtual set according to claim 19, wherein said storage means stores emission data separately for each solution of said radiosity equation.

21. A virtual set according to claim 19, wherein said processing means is configurable to combine solutions of said radiosity equation in response to changes in a request for a light bank intensity.

22. A virtual set according to claim 19, wherein said processing means is configurable to combine solutions of said radiosity equation in response to a change in a request for a light bank color.

23. A virtual set according to claim 21, wherein said light bank requests changes in real time.

24. A virtual set according to claim 23, wherein said light bank changes are determined in response to lighting control faders.

25. A virtual set according to claim 23, wherein said light bank changes are determined in response to recorded data.

26. A virtual set according to claim 23, wherein said light bank changes are determined in response to operations performed upon real lighting banks.

27. A virtual set according to claim 26, wherein real lighting banks are positioned in real space at positions substantially similar to the position of synthesised lighting banks within the virtual set.

28. A computer-readable medium having computer readable instructions executable by a computer such that said computer generates image data from scene data, wherein said scene data comprises surfaces and a plurality of light banks, the computer being configured to perform a method comprising:

setting the light banks at a maximum intensity;

constructing multi-resolution representation of a radiosity equation with respect to said scene data; and solving the radiosity equation individually for each of said light banks, wherein a light bank for which a solution is being sought is switched on with the remaining light banks being switched off.

29. A computer-readable medium having computer-readable instructions according to claim 28, wherein instructions are executable by said computer, such that scene emission data is stored separately for each solution of said radiosity equation.

30. A computer-readable medium according to claim 27, wherein said instructions are executed by said computer, such that solutions of said radiosity equation are combined in response to a change in a required light bank intensity.

31. A computer-readable medium according to claim 28, wherein said instructions are executed by said computer, such that solution of said radiosity equation are combined in response to a change in a required light bank colour.

32. A computer-readable medium according to claim 28, wherein said instructions are executed by said computer, such that said light bank requests change in real time.

33. A computer-readable medium according to claim 28, wherein said instructions are executed by said computer, such that said light bank requirements are determined in response to manually operated lighting control faders.

34. A computer-readable medium according to claim 32, wherein said instructions are executed by said computer, such that said light bank requirements are determined in response to recorded data.

35. A computer-readable medium according to claim 32, wherein said instructions are executed by said computer such that said light bank requirements are determined in response to data from a virtual set.

* * * * *